(12) United States Patent
Winter et al.

(10) Patent No.: US 12,108,763 B2
(45) Date of Patent: Oct. 8, 2024

(54) HERBICIDAL MIXTURES COMPRISING L-GLUFOSINATE OR ITS SALT AND AT LEAST ONE BLEACHER HERBICIDE

(71) Applicant: BASF SE, Ludwigshafen (DE)

(72) Inventors: Christian Harald Winter, Ludwigshafen (DE); Markus Gewehr, Limburgerhof (DE); Ryan Louis Nielson, Limburgerhof (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 18/134,321

(22) Filed: Apr. 13, 2023

(65) Prior Publication Data

US 2023/0247999 A1    Aug. 10, 2023

Related U.S. Application Data

(63) Continuation of application No. 16/636,825, filed as application No. PCT/EP2018/070945 on Aug. 2, 2018, now Pat. No. 11,666,052.

(30) Foreign Application Priority Data

Aug. 9, 2017 (EP) ..................... 17185453

(51) Int. Cl.
    *A01N 57/20* (2006.01)
    *A01N 43/56* (2006.01)
    *A01N 43/60* (2006.01)

(52) U.S. Cl.
    CPC ............. *A01N 57/20* (2013.01); *A01N 43/56* (2013.01); *A01N 43/60* (2013.01)

(58) Field of Classification Search
    CPC ......... A01N 57/20; A01N 43/56; A01N 43/60
    See application file for complete search history.

(56) References Cited

U.S. PATENT DOCUMENTS

| | | | |
|---|---|---|---|
| 4,265,654 | A | 5/1981 | Takematsu et al. |
| 5,530,142 | A | 6/1996 | Zeiss |
| 6,534,444 | B1 | 3/2003 | Sievernich et al. |
| 2011/0224077 | A1 | 9/2011 | Hacker |
| 2011/0287934 | A1 | 11/2011 | Hacker et al. |
| 2011/0294663 | A1 | 12/2011 | Hacker et al. |
| 2013/0023413 | A1 | 1/2013 | Hacker et al. |
| 2014/0201860 | A1 | 7/2014 | Hipskind et al. |
| 2014/0310835 | A1 | 10/2014 | Hipskind et al. |
| 2017/0253897 | A1 | 9/2017 | Green |
| 2020/0359629 | A1 | 11/2020 | Winter et al. |

FOREIGN PATENT DOCUMENTS

| | | | |
|---|---|---|---|
| CN | 103371176 | A | 10/2013 |
| EP | 0127429 | A2 | 12/1984 |
| EP | 0239414 | A1 | 9/1987 |
| EP | 1161866 | A1 | 12/2001 |
| JP | S59219297 | A | 12/1984 |
| WO | WO-2003/028468 | A2 | 4/2003 |
| WO | WO-03/047340 | A2 | 6/2003 |
| WO | WO-2006/104120 | A1 | 10/2006 |
| WO | WO-2009/141367 | A2 | 11/2009 |
| WO | WO-2010/067895 | A1 | 6/2010 |
| WO | WO-2016/113334 | A1 | 7/2016 |
| WO | WO-2019/030086 | A2 | 2/2019 |
| WO | WO-2019/030087 | A1 | 2/2019 |
| WO | WO-2019/030088 | A1 | 2/2019 |
| WO | WO-2019/030089 | A1 | 2/2019 |
| WO | WO-2019/030090 | A1 | 2/2019 |
| WO | WO-2019/030091 | A2 | 2/2019 |
| WO | WO-2019/030092 | A1 | 2/2019 |
| WO | WO-2019/030095 | A2 | 2/2019 |
| WO | WO-2019/030097 | A2 | 2/2019 |
| WO | WO-2019/030098 | A1 | 2/2019 |
| WO | WO-2019/030099 | A1 | 2/2019 |
| WO | WO-2019/030100 | A1 | 2/2019 |
| WO | WO-2019/030101 | A1 | 2/2019 |
| WO | WO-2019/030102 | A1 | 2/2019 |
| WO | WO-2019/030103 | A1 | 2/2019 |
| WO | WO-2019/030104 | A1 | 2/2019 |

OTHER PUBLICATIONS

Armel, et al., "Mesotrione and Glufosinate in Glufosinate-Resistant Corn", Weed Technology, vol. 22, Issue 4, 2008, pp. 591-596.
European Search Report for EP Patent Application No. 17185453.2, Issued on Apr. 20, 2018, 11 pages.
International Search Report for PCT Patent Application No. PCT/EP2018/070945, Issued on Dec. 3, 2018, 6 pages.
Ruhland, et al., "Distribution and metabolism of D/L-, L- and D-glufosinate in transgenic, glufosinate-tolerant crops of maize (*Zea mays* L ssp *mays*) and oilseed rape (*Brassica napus* L var *napus*)", Pest Management Science, vol. 60, Issue 7, 2004, pp. 691-696.
Schwerdtle, et al., "HOE 39866—Ein Neues Nicht Selektives Blattherbizid", Z. Pflkrankh. Pflschutz, Sonderh. IX, 1981, pp. 431-440.
Soloshonok, et al., "Asymmetric synthesis of phosphorus analogues of dicarboxylic ?-amino acids", Journal of the Chemical Society, Perkin Transactions 1, Issue 12, 1992, pp. 1525-1529.
Zhang, "Glufosinate-ammonium containing herbicidal composition", Database Caplus [Online], Chemical Abstracts Service, retrieved from STN Database, Accession No. 2013:1691338, XP002779644, 2 pages.
Yi-Yuan, et al., "Progresses in Biosynthesis of L-Phosphinothricin", 2009, 1 page.
U.S. Appl. No. 18/135,859, filed Apr. 18, 2023.
U.S. Appl. No. 18/135,860, filed Apr. 18, 2023.

*Primary Examiner* — Trevor Love

(74) *Attorney, Agent, or Firm* — MARSHALL, GERSTEIN & BORUN LLP

(57) ABSTRACT

Herbicidal mixtures comprising L-glufosinate or its salt and at least one bleacher herbicide The present invention relates to herbicidal mixture comprising L-glufosinate or its salt and at least one bleacher herbicide. The invention furthermore relates to a method for controlling undesirable vegetation in burndown programs, in industrial vegetation management and forestry, in vegetable and perennial crops and in turf and lawn.

20 Claims, No Drawings

HERBICIDAL MIXTURES COMPRISING L-GLUFOSINATE OR ITS SALT AND AT LEAST ONE BLEACHER HERBICIDE

CROSS-REFERENCE TO RELATED APPLICATIONS

This application is a continuation of U.S. patent application Ser. No. 16/636,825 (filed Feb. 5, 2020), which is incorporated herein by reference in its entirety and is a national stage entry of International Patent Application No. PCT/EP2018/070945 (filed Aug. 2, 2018), which claims the priority benefit of EP Application No. 17185453.2 (filed Aug. 9, 2017).

The present invention relates to herbicidal mixture comprising L-glufosinate or its salt and at least one bleacher herbicide. The invention furthermore relates to a method for controlling undesirable vegetation in burndown programs, in industrial vegetation management and forestry, in vegetable and perennial crops and in turf and lawn.

Burndown, i.e. the complete removal of weeds from the soil by application of herbicides prior to planting or emergence of a crop, is an important tool of modern weed management. Weeds present at planting will generally grow much quicker than crop plants and thus compete very early in the growing season thereby damaging the crop plants and reducing crop yield. Thus, it is desirable to plant the crop in a weed-free seed bed or to assure that essentially no weeds are present when the crop emerges. Burn-down may also entail weed control on fallow crop land.

In industrial weed management and forestry, it is desirable to control a broad range of weeds for an extended period of time. The control of large weeds, or taller species such as bushes or trees may also be desirable. Industrial weed management includes for example railway and right-of-way management, fence lines and non-crop land such as industrial and building sites, gravel areas, roads or sidewalks. Forestry includes for example the clearing of existing forest or bushland, the removal of regrowth after mechanical forest cutting, or the management of weeds under forestry plantations. In the latter case, it may be desirable to shield desirable trees from contact with the spray solution that contains the herbicidal mixture according to the present invention.

Vegetable crops includes for example aubergine, beans, bell pepper, cabbage, chili, cucumber, eggplant, lettuce, melon, onion, potato, sweet potato, spinach and tomato. For weed control in vegetable crops, it may be desirable to shield the crops from contact with the spray solution that contains the herbicidal mixture according to the present invention.

Perennial crops include trees, nuts and vine crops such as for example almond, apple, apricot, avocado, cashew nut, cherry, christmas trees, durian, orange, dragon fruit, grapes, guava, longan, mango, olive, papaya, peach, pear and other pome fruits, pistachio, plum, pomegranate, pomelo and quince and citrus crops including e.g. clementine, grapefruit, lemon, lime, mandarin and nectarine as well as nut crops including e.g. hazelnut, macadamia nut and walnut; and plantation crops such as for example banana, cacao, coconut, coffee, oil palm, pepper and other spices, plantain, rubber, sugarcane and tea. Also included are ornamentals such as, for example, azaleas, rhododendron, roses and nurseries. For weed control in perennial crops, it may be desirable to shield the crops from contact with the spray solution that contains the herbicidal mixture according to the present invention.

The compositions according to the invention can also be used for weed control in turf and lawn provided the desirable grass species are tolerant to the herbicidal mixture. In particular, such mixtures can be used in desirable grass that has been rendered tolerant to glufosinate by mutagenesis or genetic engineering.

Glufosinate and its salts are non-selective systemic herbicides having a good post-emergence activity against numerous weeds and thus can be used in burndown programs, in industrial vegetation management and forestry, in vegetable and perennial crops and in turf and lawn. However, solo application of glufosinate often yields unsatisfactory weed control, and several applications and/or high dosage rates are often required. Moreover, the effectiveness of glufosinate against some weeds is not fully sufficient.

Therefore, it is frequently recommended to apply glufosinate in combination with at least one further herbicide. However, the effectiveness of such combinations is often not satisfactory and high application rates are still required to achieve acceptable weed control. Moreover, the reliability and persistence of such combinations depends strongly on the weathering conditions and certain difficult to control weed species may escape. In addition, the herbicidal activity of these mixtures persists only for a short time, which allows effective burndown only within a small timeframe prior to planting a crop.

Thus, it is an object of the present invention to provide a herbicidal mixture, which allows efficient and reliable control of grass and broadleaf weeds in a burndown program, in industrial vegetation management and forestry, in vegetable and perennial crops and in turf and lawn. Moreover, the persistence of the herbicidal activity of the mixture should be sufficiently long in order to achieve control of the weeds over a sufficient long time period thus allowing a more flexible application. The mixture should also have a low toxicity to humans or other mammals. The mixtures should also show an accelerated action on harmful plants, i.e. they should affect damaging of the harmful plants more quickly in comparison with application of the individual herbicides.

Glufosinate is a racemate of two enantiomers, out of which only one shows sufficient herbicidal activity (see e.g. U.S. Pat. No. 4,265,654 and JP92448/83). Even though various methods to prepare L-glufosinate (and respective salts) are known, the mixtures known in the art do not point at the stereochemistry, meaning that the racemate is present (e.g. WO2009141367).

Surprisingly, it has been found that mixtures of L-glufosinate or its salt and at least one bleacher herbicide show a higher activity in burndown programs, in industrial vegetation management and forestry, in vegetable and perennial crops and in turf and lawn, if compared to L-glufosinate alone.

Surprisingly, it has been found that mixtures of L-glufosinate or its salt and at least one bleacher herbicide show a higher activity in burndown programs, in industrial vegetation management and forestry, in vegetable and perennial crops and in turf and lawn, if compared to mixtures of racemic glufosinate and at least one bleacher herbicide. Bleacher herbicides are also called pigment synthesis inhibitors.

Thus, the present invention relates to herbicidal mixtures of
1) L-glufosinate or its salt as compound I and
2) at least one bleacher herbicide as compound II, preferably selected from the group consisting of beflubutamid, diflufenican, fluridone, flurochloridone, flurtamone, norflurazon, picolinafen, 4-(3-trifluoromethylphenoxy)-2-(4-trifluoromethylphenyl)pyrimidine (CAS 180608-33-7); benzobicyclon, benzofenap, bicyclopyrone, clomazone, fenquinotrione, isoxaflutole, mesotrione, pyrasulfotole, pyrazolynate, pyrazoxyfen, sulcotrione, tefuryltrione, tembotrione, tolpyralate, topramezone; aclonifen, amitrole and flumeturon.

In a preferred embodiment, the abovementioned invention relates to herbicidal mixtures as described above, wherein L-glufosinate comprises more than 70% by weight of the L-enantiomer.

Glufosinate [common name of DL-4-[hydroxyl(methyl)phosphinoyl]-DL-homoalaninate] and its salts such as glufosinate ammonium and its herbicidal acitivity have been described e.g. by F. Schwerdtle et al. Z. Pflanzenkr. Pflanzenschutz, 1981, Sonderheft IX, pp. 431-440. Glufosinate as racemate and its salts are commercially available, e.g. from Bayer CropScience under the tradenames Basta™ and Liberty™.

L-Glufosinate as used in the present invention comprises more than 70% by weight of the L-enantiomer; preferably more than 80% by weight of the L-enantiomer; more preferably more than 90% of the L-entantiomer, most preferably more than 95% of the L-enantiomer and can be prepared as referred to above. L-Glufosinate can be prepared according to methods known in the art, e.g. as described in WO2006/104120, U.S. Pat. No. 5,530,142, EP0127429 and J. Chem. Soc. Perkin Trans. 1, 1992, 1525-1529.

L-Glufosinate, also called glufosinate-P, is (2S)-2-amino-4-[hydroxy(methyl)phosphinoyl]butyric acid (CAS Reg. No. 35597-44-5). Relevant salts of L-glufosinate are L-glufosinate-ammonium (also called glufosinate-P-ammonium), which is ammonium (2S)-2-amino-4-(methylphosphinato)butyric acid (CAS Reg. No. 73777-50-1); L-glufosinate-sodium (also called glufosinate-P-sodium), which is sodium (2S)-2-amino-4-(methylphosphinato)butyric acid (CAS Reg. No. 70033-13-5) and L-glufosinate-potassium (also called glufosinate-P-potassium), which is potassium (2S)-2-amino-4-(methylphosphinato)butyric acid.

Compounds II as well as their pesticidal action and methods for producing them are generally known, for example in the Pesticide Manual V5.2 (ISBN 978 1 901396 85 0) (2008-2011) amongst other sources.

In the inventive mixtures the weight ratio of compound I to compound II is preferably from 1000:1 to 1:500, 400:1 to 1:40, more preferably 500:1 to 1:250, in particular from 200:1 to 1:20, even more preferably from 100:1 to 1:10, most preferrably 50:1 to 1:5.

Furthermore, mixtures are preferred, which contain L-glufosinate-ammonium or L-glufosinate-sodium as L-glufosinate salts or L-glufosinate as free acid. Especially preferred are mixtures, which contain L-glufosinate-ammonium as L-glufosinate salt.

Preferred compounds II are picolinafen, mesotrione, tolpyralate, topramezone, amitrole, diflufenican, clomazone, isoxaflutole, fenquinotrione and tembotrione.

Preferred compounds II are picolinafen, mesotrione, tolpyralate, topramezone, amitrole, diflufenican, clomazone, isoxaflutole and tembotrione.

More preferred compounds II are picolinafen, mesotrione, tolpyralate and topramezone.

In a further embodiment, the compound II is selected from the group consisting of bicyclopyrone, isoxaflutole, mesotrione, tembotrione, tolpyralate, fenquinotrione and topramezone.

In a further embodiment, the compound II is selected from the group consisting of bicyclopyrone, isoxaflutole, mesotrione, tembotrione, tolpyralate and topramezone.

In a further preferred embodiment, the compound II is tolpyralate.

In a further preferred embodiment, the compound II is fenquinotrione.

Thus, preferred mixtures of the present invention are mixtures of L-glufosinate-ammonium or L-glufosinate-sodium as L-glufosinate salts or L-glufosinate as free acid and a bleacher herbicide selected from the group consisting of picolinafen, mesotrione, tolpyralate, topramezone, amitrole, diflufenican, clomazone, isoxaflutole, fenquinotrione and tembotrione.

Other preferred mixtures of the present invention are mixtures of L-glufosinate-ammonium or L-glufosinate-sodium as L-glufosinate salts or L-glufosinate as free acid and a bleacher herbicide selected from the group consisting of picolinafen, mesotrione, tolpyralate, topramezone, amitrole, diflufenican, clomazone, isoxaflutole and tembotrione.

Further preferred mixtures are mixtures of L-glufosinate-ammonium or L-glufosinate-sodium as L-glufosinate salts or L-glufosinate as free acid and a bleacher herbicide selected from the group consisting of bicyclopyrone, isoxaflutole, mesotrione, tembotrione, fenquinotrione, tolpyralate and topramezone.

Further preferred mixtures are mixtures of L-glufosinate-ammonium or L-glufosinate-sodium as L-glufosinate salts or L-glufosinate as free acid and a bleacher herbicide selected from the group consisting of bicyclopyrone, isoxaflutole, mesotrione, tembotrione, tolpyralate and topramezone.

Even more preferred are mixtures of the present invention are mixtures of L-glufosinate-ammonium or L-glufosinate-sodium as L-glufosinate salts or L-glufosinate as free acid and tolpyralate.

Also even more preferred are mixtures of the present invention are mixtures of L-glufosinate-ammonium or L-glufosinate-sodium as L-glufosinate salts or L-glufosinate as free acid and fenquinotrione.

All preferred mixtures are listed in table 2, wherein the following abbreviations are used in table 1:

TABLE 1

| Compound | Abbreviation |
|---|---|
| L-glufosinate-ammonium | I-1 |
| L-glufosinate-sodium | I-2 |
| L-glufosinate as free acid | I-3 |
| picolinafen | II-1 |
| mesotrione | II-2 |
| tolpyralate | II-3 |
| topramezone | II-4 |
| amitrole | II-5 |
| diflufenican | II-6 |
| clomazone | II-7 |
| isoxaflutole | II-8 |
| tembotrione | II-9 |
| bicyclopyrone | II-10 |
| fenquinotrione | II-11 |

TABLE 2

| No | I | II |
|---|---|---|
| M-1 | I-1 | II-1 |
| M-2 | I-1 | II-2 |
| M-3 | I-1 | II-3 |
| M-4 | I-1 | II-4 |
| M-5 | I-1 | II-5 |
| M-6 | I-1 | II-6 |
| M-7 | I-1 | II-7 |
| M-8 | I-1 | II-8 |
| M-9 | I-1 | II-9 |

TABLE 2-continued

| No | I | II |
|---|---|---|
| M-10 | I-2 | II-1 |
| M-11 | I-2 | II-2 |
| M-12 | I-2 | II-3 |
| M-13 | I-2 | II-4 |
| M-14 | I-2 | II-5 |
| M-15 | I-2 | II-6 |
| M-16 | I-2 | II-7 |
| M-17 | I-2 | II-8 |
| M-18 | I-2 | II-9 |
| M-19 | I-3 | II-1 |
| M-20 | I-3 | II-2 |
| M-21 | I-3 | II-3 |
| M-22 | I-3 | II-4 |
| M-23 | I-3 | II-5 |
| M-24 | I-3 | II-6 |
| M-25 | I-3 | II-7 |
| M-26 | I-3 | II-8 |
| M-27 | I-3 | II-9 |
| M-28 | I-1 | II-10 |
| M-29 | I-2 | II-10 |
| M-30 | I-3 | II-10 |
| M-31 | I-1 | II-11 |
| M-32 | I-2 | II-11 |
| M-33 | I-3 | II-11 |

More preferred mixtures of the present invention are mixtures of L-glufosinate-ammonium or L-glufosinate-sodium as L-glufosinate salts or L-glufosinate as free acid and a bleacher herbicide selected from the group consisting of picolinafen, mesotrione, tolpyralate and topramezone.

Thus, more preferred are mixtures M-1, M-2, M-3, M-4, M-10, M-11, M-12, M-13, M-19, M-20, M-21 and M-22.

Also preferred are mixtures M-2, M-11, M-20, M-3, M-12, M-21, M-4, M-13, M-22, M-8, M-17, M-26, M-9, M-18, M-27, M-28, M-29, M-30, M-31, M-32 and M-33.

Also preferred are mixtures M-1, M-2, M-3 and M-4. Even more preferred are mixtures M-3, M-12 and M-21. Also preferred are mixtures M-31, M-32 and M-33.

All above-referred mixtures are herein below referred to as "inventive mixtures".

The inventive mixtures can further contain one or more insecticides, fungicides, herbicides.

The inventive mixtures can be converted into customary types of agrochemical mixtures, e.g. solutions, emulsions, suspensions, dusts, powders, pastes, granules, pressings, capsules, and mixtures thereof. Examples for mixture types are suspensions (e.g. SC, OD, FS), emulsifiable concentrates (e.g. EC), emulsions (e.g. EW, EO, ES, ME), capsules (e.g. CS, ZC), pastes, pastilles, wetable powders or dusts (e.g. WP, SP, WS, DP, DS), pressings (e.g. BR, TB, DT), granules (e.g. WG, SG, GR, FG, GG, MG), insecticidal articles (e.g. LN), as well as gel formulations for the treatment of plant propagation materials such as seeds (e.g. GF). These and further mixtures types are defined in the "Catalogue of pesticide formulation types and international coding system", Technical Monograph No. 2, 6$^{th}$ Ed. May 2008, CropLife International.

The mixtures are prepared in a known manner, such as described by Mollet and Grubemann, Formulation technology, Wiley VCH, Weinheim, 2001; or Knowles, New developments in crop protection product formulation, Agrow Reports DS243, T&F Informa, London, 2005.

Suitable auxiliaries are solvents, liquid carriers, solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Suitable solvents and liquid carriers are water and organic solvents, such as mineral oil fractions of medium to high boiling point, e.g. kerosene, diesel oil; oils of vegetable or animal origin; aliphatic, cyclic and aromatic hydrocarbons, e.g. toluene, paraffin, tetrahydronaphthalene, alkylated naphthalenes; alcohols, e.g. ethanol, propanol, butanol, benzylalcohol, cyclohexanol; glycols; DMSO; ketones, e.g. cyclohexanone; esters, e.g. lactates, carbonates, fatty acid esters, gamma-butyrolactone; fatty acids; phosphonates; amines; amides, e.g. N-methylpyrrolidone, fatty acid dimethylamides; and mixtures thereof.

Suitable solid carriers or fillers are mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharides, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emulsifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.)

Suitable anionic surfactants are alkali, alkaline earth or ammonium salts of sulfonates, sulfates, phosphates, carboxylates, and mixtures thereof. Examples of sulfonates are alkylarylsulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable nonionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are home- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide.

Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds, which have a neglectable or even no pesticidal activity themselves, and which improve the biological performance of the inventive mixtures on the target. Examples are surfactants, mineral or vegetable oils, and other auxilaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazolinones and benzisothiazolinones.

Suitable anti-freezing agents are ethylene glycol, propylene glycol, urea and glycerin.

Suitable anti-foaming agents are silicones, long chain alcohols, and salts of fatty acids.

Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants).

Suitable tackifiers or binders are polyvinylpyrrolidons, polyvinylacetates, polyvinyl alcohols, polyacrylates, biological or synthetic waxes, and cellulose ethers.

Examples for mixture types and their preparation are:

i) Water-Soluble Concentrates (SL, LS)

10-60 wt % of an inventive mixture and 5-15 wt % wetting agent (e.g. alcohol alkoxylates) are dissolved in water and/or in a water-soluble solvent (e.g. alcohols) ad 100 wt %. The active substance dissolves upon dilution with water.

ii) Dispersible Concentrates (DC)

5-25 wt % of an inventive mixture and 1-10 wt % dispersant (e.g. polyvinylpyrrolidone) are dissolved in organic solvent (e.g. cyclohexanone) ad 100 wt %. Dilution with water gives a dispersion.

iii) Emulsifiable Concentrates (EC)

15-70 wt % of an inventive mixture and 5-10 wt % emulsifiers (e.g. calcium dodecylbenzenesulfonate and castor oil ethoxylate) are dissolved in water-insoluble organic solvent (e.g. aromatic hydrocarbon) ad 100 wt %. Dilution with water gives an emulsion.

iv) Emulsions (EW, EO, ES)

5-40 wt % of an inventive mixture and 1-10 wt % emulsifiers (e.g. calcium dodecylbenzenesulfonate and castor oil ethoxylate) are dissolved in 20-40 wt % water-insoluble organic solvent (e.g. aromatic hydrocarbon). This mixture is introduced into water ad 100 wt % by means of an emulsifying machine and made into a homogeneous emulsion. Dilution with water gives an emulsion.

v) Suspensions (SC, OD, FS)

In an agitated ball mill, 20-60 wt % of an inventive mixture are comminuted with addition of 2-10 wt % dispersants and wetting agents (e.g. sodium lignosulfonate and alcohol ethoxylate), 0.1-2 wt % thickener (e.g. xanthan gum) and water ad 100 wt % to give a fine active substance suspension. Dilution with water gives a stable suspension of the active substance. For FS type mixture up to 40 wt % binder (e.g. polyvinylalcohol) is added.

vi) Water-Dispersible Granules and Water-Soluble Granules (WG, SG)

50-80 wt % of an inventive mixture are ground finely with addition of dispersants and wetting agents (e.g. sodium lignosulfonate and alcohol ethoxylate) ad 100 wt % and prepared as water-dispersible or water-soluble granules by means of technical appliances (e.g. extrusion, spray tower, fluidized bed). Dilution with water gives a stable dispersion or solution of the active substance.

vii) Water-Dispersible Powders and Water-Soluble Powders (WP, SP, WS)

50-80 wt % of an inventive mixture are ground in a rotor-stator mill with addition of 1-5 wt % dispersants (e.g. sodium lignosulfonate), 1-3 wt % wetting agents (e.g. alcohol ethoxylate) and solid carrier (e.g. silica gel) ad 100 wt %. Dilution with water gives a stable dispersion or solution of the active substance.

viii) Gel (GW, GF)

In an agitated ball mill, 5-25 wt % of an inventive mixture are comminuted with addition of 3-10 wt % dispersants (e.g. sodium lignosulfonate), 1-5 wt % thickener (e.g. carboxymethylcellulose) and water ad 100 wt % to give a fine suspension of the active substance. Dilution with water gives a stable suspension of the active substance.

ix) Microemulsion (ME)

5-20 wt % of an inventive mixture are added to 5-30 wt % organic solvent blend (e.g. fatty acid dimethylamide and cyclohexanone), 10-25 wt % surfactant blend (e.g. alcohol ethoxylate and arylphenol ethoxylate), and water ad 100%. This mixture is stirred for 1 h to produce spontaneously a thermodynamically stable microemulsion.

x) Microcapsules (CS)

An oil phase comprising 5-50 wt % of an inventive mixture, 0-40 wt % water insoluble organic solvent (e.g. aromatic hydrocarbon), 2-15 wt % acrylic monomers (e.g. methylmethacrylate, methacrylic acid and a di- or triacrylate) are dispersed into an aqueous solution of a protective colloid (e.g. polyvinyl alcohol). Radical polymerization initiated by a radical initiator results in the formation of poly(meth)acrylate microcapsules. Alternatively, an oil phase comprising 5-50 wt % of an inventive mixture according to the invention, 0-40 wt % water insoluble organic solvent (e.g. aromatic hydrocarbon), and an isocyanate monomer (e.g. diphenylmethene-4,4'-diisocyanatae) are dispersed into an aqueous solution of a protective colloid (e.g. polyvinyl alcohol). The addition of a polyamine (e.g. hexamethylenediamine) results in the formation of polyurea microcapsules. The monomers amount to 1-10 wt %. The wt % relate to the total CS mixture.

xi) Dustable Powders (DP, DS)

1-10 wt % of an inventive mixture are ground finely and mixed intimately with solid carrier (e.g. finely divided kaolin) ad 100 wt %.

xii) Granules (GR, FG)

0.5-30 wt % of an inventive mixture is ground finely and associated with solid carrier (e.g. silicate) and 100 wt %. Granulation is achieved by extrusion, spray-drying or fluidized bed.

xiii) Ultra-Low Volume Liquids (UL)

1-50 wt % of an inventive mixture are dissolved in organic solvent (e.g. aromatic hydrocarbon) ad 100 wt %.

The mixtures types i) to xiii) may optionally comprise further auxiliaries, such as 0.1-1 wt % bactericides, 5-15 wt % anti-freezing agents, 0.1-1 wt % anti-foaming agents, and 0.1-1 wt % colorants.

The resulting agrochemical mixtures generally comprise between 0.01 and 95%, preferably between 0.1 and 90%, and in particular between 0.5 and 75%, by weight of active substance. The active substances are employed in a purity of from 90% to 100%, preferably from 95% to 100% (according to NMR spectrum).

Solutions for seed treatment (LS), Suspoemulsions (SE), flowable concentrates (FS), powders for dry treatment (DS), water-dispersible powders for slurry treatment (WS), water-soluble powders (SS), emulsions (ES), emulsifiable concentrates (EC) and gels (GF) are usually employed for the purposes of treatment of plant propagation materials, particularly seeds. The mixtures in question give, after two-to-tenfold dilution, active substance concentrations of from 0.01 to 60% by weight, preferably from 0.1 to 40%, in the ready-to-use preparations. Application can be carried out before or during sowing. Methods for applying the inventive mixtures and mixtures thereof, respectively, on to plant propagation material, especially seeds include dressing, coating, pelleting, dusting, soaking and in-furrow application methods of the propagation material. Preferably, the inventive mixtures or the mixtures thereof, respectively, are applied on to the plant propagation material by a method such that germination is not induced, e.g. by seed dressing, pelleting, coating and dusting.

The invention also relates to an herbicidal formulation, which comprises a herbicidally active mixture as defined herein and at least one carrier material, including liquid and/or solid carrier materials.

Various types of oils, wetters, adjuvants, fertilizer, or micronutrients, and further pesticides (e.g. herbicides, insecticides, fungicides, growth regulators, safeners) may be added to the active substances or the inventive mixtures comprising them as premix or, if appropriate not until immediately prior to use (tank mix). These agents can be admixed with the inventive mixtures in a weight ratio of 1:100 to 100:1, preferably 1:10 to 10:1.

The user applies the mixture according to the invention usually from a predosage device, a knapsack sprayer, a spray tank, a spray plane, or an irrigation system. Usually, the agrochemical mixture is made up with water, buffer, and/or further auxiliaries to the desired application concentration and the ready-to-use spray liquor or the agrochemical mixture according to the invention is thus obtained. Usually, 20 to 2000 liters, preferably 50 to 400 liters, of the ready-to-use spray liquor are applied per hectare of agricultural useful area.

As outlined above, the invention also relates to the use of a mixture as defined herein for controlling undesirable vegetation in burndown programs, in industrial vegetation management and forestry, in vegetable and perennial crops and in turf and lawn, wherein the inventive mixtures can be applied pre- or post-emergence, i.e. before, during and/or after emergence of the undesirable plants. Preferred is the application as post-emergence treatment, i.e. during and/or after emergence of the undesirable plants. Herein, the inventive mixtures are applied to a locus where crops will be planted before planting or emergence of the crop.

Therefore, the present invention also relates to a method for burndown treatment of undesirable vegetation in crops, comprising applying an inventive mixture to a locus where crops will be planted before planting (or seeding) or emergence of the crop. Herein, the inventive mixture is applied undesirable vegetation or the locus thereof.

Thus, the present invention therefore relates to a method for controlling undesirable vegetation, which method comprises applying an inventive mixture to a locus where undesirable vegetation is present or is expected to be present, wherein application can be done before, during and/or after, preferably during and/or after, the emergence of the undesirable vegetation As used herein, the terms "controlling" and "combating" are synonyms.

As used herein, the terms "undesirable vegetation", "undesirable species", "undesirable plants", "harmful plants", "undesirable weeds", or "harmful weeds" are synonyms.

The term "locus", as used herein, means the area in which the vegetation or plants are growing or will grow, typically a field.

In such burndown programs, the inventive mixtures can be applied prior to seeding (planting) or after seeding (or planting) of the crop plants but before the emergence of the crop plants, in particular prior to seeding. The inventive mixtures are preferably applied prior to seeding of the crop plants. For burndown, the inventive mixtures will generally be applied a date up to 9 months, frequently up to 6 months, preferably up to 4 months prior to planting the crop. The burndown application can be done at a date up to 1 day prior to emergence of the crop plant and is preferably done at a date prior to seeding/planting of the crop plant, preferably at a date of at least one day, preferably at least 2 days and in particular at least one 4 days prior to planting or from 6 months to 1 day prior emergence, in particular from 4 months to 2 days prior emergence and more preferably from 4 months to 4 days prior emergence. It is, of course, possible to repeat the burndown application once or more, e.g. once, twice, three times, four times or five times within that time frame.

It is a particular benefit of the inventive mixtures that they have a very good post-emergence herbicide activity, i.e. they show a good herbicidal activity against emerged undesirable plants. Thus, in a preferred embodiment of invention, the inventive mixtures are applied post-emergence, i.e. during and/or after, the emergence of the undesirable plants. It is particularly advantageous to apply the inventive mixtures post emergent when the undesirable plant starts with leaf development up to flowering. The inventive mixtures are particularly useful for controlling undesirable vegetation which has already developed to a state, which is difficult to control with conventional burndown mixtures, i.e. when the individual weed is taller than 10 cm (4 inches) or even taller than 15 cm (6 inches) and/or for heavy weed populations.

In the case of a post-emergence treatment of the plants, the inventive mixtures are preferably applied by foliar application.

If the active compounds I and II are less well tolerated by certain crop plants, application techniques may be used in which the herbicidal compositions are sprayed, with the aid of the spraying equipment, in such a way that as far as possible they do not come into contact with the leaves of the sensitive crop plants, while the active compounds reach the leaves of undesirable plants growing underneath, or the bare soil surface (post-directed, lay-by). In addition, spray shields may be used.

Application may be effected, for example, by usual spraying techniques with water as the carrier, using amounts of spray mixture of usually from 10 to 2000 l/ha, in particular 50 to 1000 l/ha. The required application rate of the mixture of the pure active compounds depends on the density of the undesired vegetation, on the development stage of the plants, on the climatic conditions of the location where the mixture is used and on the application method. In general, the application rate of the mixture is from 55 to 6000 g/ha, preferably from 100 to 5000 g/ha, from 200 to 4000 g/ha, and more preferably from 300 to 3000 g/ha of active ingredient (a.i.). When using the inventive mixtures in the methods of the present invention, the active compounds present in the inventive mixtures can be applied simultaneously or in succession, where undesirable vegetation may occur. Herein, it is immaterial whether the individual compounds present in the inventive mixtures are formulated jointly or separately and applied jointly or separately, and, in the case of separate application, in which order the application takes place. It is only necessary, that the individual compounds present in the inventive mixtures are applied in a time frame, which allows simultaneous action of the active ingredients on the undesirable plants.

As mentioned above, the inventive mixtures have several advantages i.e. enhanced herbicide action in comparison if compared to mixtures of racemic glufosinate with a bleacher herbicide.

Moreover, the inventive mixtures show a persistant herbicidal activity, even under difficult weathering conditions, which allows a more flexible application in burndown applications and minimizes the risk of weeds escaping. Apart form that, the inventive mixtures show superior crop compatibility with certain conventional crop plants and with herbicide tolerant crop plants, i.e. their use in these crops leads to a reduced damage of the crop plants and/or does not result in increased damage of the crop plants. Thus, the inventive mixtures can also be applied after the emergence of the crop plants. The inventive mixtures may also show an accelerated action on harmful plants, i.e. they may affect damage of the harmful plants more quickly if compared to mixtures of racemic glufosinate with at least one bleacher herbicide.

Both L-glufosinate alone as well as, in the methods of the present invention, the inventive mixtures are suitable for controlling a large number of harmful plants in agricultural crops, including monocotyledonous weeds, in particular annual weeds such as gramineous weeds (grasses) including *Echinochloa* species such as barnyardgrass (*Echinochloa crusgalli* var. *crus-galli*), *Echinchloa walteri* (Pursh) Heller, jungle rice (*Echinochloa colona*), *Echinochloa crus-pavonis*, *Echinochloa oryzicola*, *Digitaria* species such as crabgrass (*Digitaria sanguinalis*), *Digitaria horizontalis*, sourgrass (*Digitaria insularis*) or naked crabgrass (*Digitaria nuda*), *Setaria* species such as green foxtail (*Setaria viridis*), giant foxtail (*Setaria faberii*), yellow foxtail (*Setaria glauca* or *Setaria pumila*) or *Setaria verticillata*, *Sorghum* species such as johnsongrass (*Sorghum halepense* Pers.), *Avena* species such as wild oats (*Avena fatua*), *Avena sterillis* or *Avena strigosa*, *Cenchrus* species such as *Cenchrus* species such as field sandbur (*Cenchrus pauciflorus*) or *Cenchrus echinatus*, *Bromus* species such as *Bromus japonicus* Thunb, *Bromus sterilis* or *Bromus tectorum*, *Lolium* species, *Phalaris* species such as *Phalaris brachystachys*, *Phalaris minor* or *Phalaris persicaria*, *Eriochloa* species, *Panicum* species such as fall panicum (*Panicum dichotomiflorum*), *Panicum fasciculatum* or *Panicum maximum*, *Brachiaria* species, annual bluegrass (*Poa annua*), *Alopecurus* species such as blackgrass (*Alopecurus myosuroides*), *Alopecurus aequalis* Sobol or *Alopecurus japonicus* Steud, *Aegilops* species such as *Aegilops cylindrica* or *Aegylops tauschii*, *Apera spica-venti*, *Eleusine indica*, *Cynodon dactylon*, couch grass (*Agropyron repens* or *Elymus repens*), *Agrostis alba*, *Beckmannia syzigachne* (Steud.) Fernald, *Chloris* species such as *Chloris virgata*, *Commelina* species such as *Commelina benghalensis*, *Commelina communis*, *Commelina diffusa* or *Commelina erecta*, *Dactyloctenium aegyptium*, *Hordeum jubatum*, *Hordeum leporinum*, *Imperata cylindrica*, *Ischaemum rogusum*, *Ixophorus unisetus*, *Leerisa hexandra*, *Leersia japonica*, *Leptochloa* species such as *Leptochloa chinensis*, *Leptochloa fascicularis*, *Leptochloa filiformis* or *Leptochloa panicoides*, *Lolium* species such as *Lolium multiflorum*, *Lolium perenne*, *Lolium persicum* or rigid ryegrass (*Lolium rigidum*), *Luziola subintegra*, *Murdannia nudiflora* (L.) Brenan, *Oryza latifolia*, *Oryza rufipogon*, *Paspalum distichum*, *Paspalum* species, *Pennisetum americanum*, *Pennisetum purpureum*, *Phleum paniculatum*, *Phragmites australia*, *Ploypogon fugax*. N., *Poa* species such as *Poa annua* or *Poa trivialis* L., *Puccinellia distans*, *Rottboellia cochinchinensis*, *Sclerochloa kengiana* (Ohwi) Tzvel., *Trichloris crinita*, *Urochloa* or *Brachiaria* species such as *Brachiaria decumbens*, *Brachiaria plantaginea*, *Brachiaria platyphylla*, *Urochloa panicoides*, *Urochloa ramosa* and the like.

Both L-glufosinate alone as well as the inventive mixtures are also suitable for controlling a large number of dicotyledonous weeds, in particular broad leaf weeds including *Polygonum* species such as wild buckwheat (*Polygonum convolvulus*), *Polygonum pensilvanicum*, *Polygonum persicaria* or prostrate knotweed (*Polygonum aviculare*), *Amaranthus* species such as pigweed (*Amaranthus retroflexus*), Palmer amaranth (*Amaranthus palmeri*), tall waterhemp (*Amaranthus tuberculatus* or *Amaranthus rudis*), redroot pigweed (*Amaranthus retroflexus*), green amaranth (*Amaranthus hybridus*), purple amaranth (*Amaranthus lividus*), prickly amaranth (*Amaranthus spinosus*) or *Amaranthus quitensis*, *Chenopodium* species such as common lambsquarters (*Chenopodium album* L.), *Chenopodium serotinum* or *Quinoa* (*Chenopodium quinoa*), *Sida* species such as prickly sida (*Sida spinosa* L.), *Ambrosia* species such as common ragweed (*Ambrosia artemisiifolia*) or giant ragweed (*Ambrosia trifida*), *Acanthospermum* species, *Anthemis* species such as *Anthemis arvensis* or *Anthemis cotula*, *Atriplex* species, *Cirsium* species such as *Cirsium arvense*, *Convolvulus* species such as field bindweed (*Convolvulus arvensis*), *Conyza* species such as horseweed (*Conyza canadensis*, *Erigeron canadensis*) or hairy fleabane (*Conyza bonariensis*, *Erigeron bonariensis*), *Cassia* species, *Datura* species such as jimsonweed (*Datura stramonium*), *Euphorbia* species such as toothed spurge (*Euphorbia dentata*), *Euphorbia hirta*, *Euphorbia helioscopia* or fireplant (*Euphorbia heterophylla*), *Geranium* species such as *Geranium donianum* or *Geranium pusillum*, *Galinsoga* species, morningglory (*Ipomoea* species), *Lamium* species such as henbit dead-nettle (*Lamium amplexicaule*), *Malva* species such as dwarf mallow (*Malva neglecta*) or cheeseweed (*Malwa parviflora*), *Matricaria* species such as chamomile (*Matricaria chamomilla*) or *Matricaria inodora*, *Sysimbrium* species, *Solanum* species such as black nightshade (*Solanum nigrum*), *Xanthium* species, *Veronica* species such as *Veronica polita*, *Viola* species, common chickweed (*Stellaria media*), velvetleaf (*Abutilon theophrasti*), *Sesbania* species such as *Sesbania exaltata*, *Sesbania herbacea* or hemp *sesbania* (*Sesbania exaltata* Cory), *Anoda cristata*, *Bidens* species such as *Bidens frondosa* or *Bidens pilosa*, *Brassica kaber*, *Capsella* species such as *Capsella* media or *Capsella bursa-pastoris*, *Centaurea cyanus*, *Galeopsis tetrahit*, *Galium aparine*, *Helianthus annuus*, *Desmodium tortuosum*, *Kochia scoparia*, *Mercurialis annua*, *Myosotis arvensis*, *Papaver rhoeas*, *Raphanus* species such as wild radish (*Raphanus raphanistrum*), *Salsola* species such as *Salsola tragus* or *Salsola kali*, *Sinapis arvensis*, *Sonchus* species such as *Sonchus asper*, *Sonchus arvensis* or *Sonchus oleraceus*, *Thlaspi arvense*, *Tagetes minuta*, *Richardia* species such as *Richardia scabra* or *Richardia brasiliensis*, *Aeschynomeme* species such as *Aeschynomeme denticulata*, *Aeschynomeme indica* or *Aeschynomene rudis*, *Alisma* species such as *Alisma canaliculatum* or *Alisma plantago-aquatica*, *Borreria* species such as *Borreria verticillata*, *Brassica rapa, Carduus acanthoides, Parietaria debilis, Portulaca oleracea, Ipomoea* species such as *Ipomoea grandifolia, Ipomoea hederacea, Ipomoea indivisa, Ipomoea lacunose, Ipomoea lonchophylla* or *Ipomoea wrightii, Senna obtusifolia, Sida* species such as arrowleaf sida (*Sida rhombifolia*) or prickly sida (*Sida spinosa*), *Spermacoce latifolia, Tridax procumbens, Trianthema portulacastrum, Parthenium hysterophorus, Portulaca oleracea, Acalypha australis, Ammi majus, Atriplex* species, *Orobanche* species, *Mercurialis annua, Cirsium arvense, Calystegia sepium, Stellaria media, Lamium* species, *Viola* species, *Celosia argentea, Melampodium divaricatum, Cleome viscosa, Molugo verticilatus, Borhevia erecta, Gomphrena* species, *Nicandra physalodes, Ricinus communis, Geranium dissectum, Alternanthera* species such as *Althernanthera philoxeroides* or *Alternanthera tenella, Ammannia* species such as *Ammania coccinea, Anacamtodon fortunei* Mitt., *Anagallis arvensis, Aneilema keisak, Arenaria serpyllifolia, Argemone mexicana, Asphodelus tenuifolius, Atriplex patula, Bacopa rotundifolia, Brassica napus, Caperonia* species such as *Caperonia castaneifolia* or *Caperonia palustris, Cephalanoplos segetum, Corynopus didymus, Crepis capillaris, Crepis tectorum, Croton lobatus, Descuminia sophia* (L.), *Descurainia pinnata, Echinodorus grandiflorus, Eclipta alba, Eclipta prostrata, Eichhornia crassipes, Eleocharis* species, *Equisetum arvense, Fallopia convolvulus, Fallopia convolvulus, Heteranthera limosa, Jussiaea* species, *Kallstroemia maxima, Lactuca serriola, Lathyrus aphaca, Launea mudicaulis, Leucas chinensis, Limnocharis flava, Lindernia dubia, Lindernia pyxidaria, Litospermum arvense, Ludwigia* species such as *Ludwigia octovallis, Macroptilium lathyroides, Malachium aquaticum* (L.), *Melilotus* species, *Merremia aegyptia, Momordica charantia, Monochoria hastate, Monochoria vaginalis, Mucuna* species, *Murdannia nudiflora, Oxalis neaei, Phylanthus* species, *Physalis* species, *Pistia* stratiotes, *Potamogeton distinctus, Rorippa islandica, Rotala indica, Rotala ramosior, Rumex dentatus, Rumex obtusifolius, Sagittaria montevidensis, Sagittaria pygmaea* Miq., *Sagittaria sagittifolia, Sagittaria trifolia* L., *Senecio vulgaris, Sicyos polyacanthus, Silene gallica*, chenopo *Sisymbrium* species such as *Sisymbrium oficinale, Solanum* species, *Spergula arvensis, Sphenoclea zeylanica, Trianthema* spp., *Tripleurospermum inodorum, Veronica* species such as *Veronica persica* or *Veronica polita Vicia sativa* and the like.

Both L-glufosinate alone as well as the inventive mixtures are also suitable for controlling a large number of annual and perennial sedge weeds including *Cyperus* species such as purple nutsedge (*Cyperus rotundus* L.), yellow nutsedge (*Cyperus esculentus* L.), hime-kugu (*Cyperus brevifolius* H.), sedge weed (*Cyperus microiria* Steud), rice flatsedge (*Cyperus iria* L.), *Cyperus difformis, Cyperus difformis* L., *Cyperus esculentus, Cyperus ferax, Cyperus flavus, Cyperus iria, Cyperus lanceolatus, Cyperus odoratus, Cyperus rotundus, Cyperus serotinus* Rottb., *Eleocharis acicularis, Eleocharis kuroguwai, Fimbristylis dichotoma, Fimbristylis miliacea, Scirpus grossus, Scirpus juncoides, Scirpus juncoides* Roxb, *Scirpus* or *Bolboschoenus maritimus, Scirpus* or *Schoenoplectus mucronatus, Scirpus planiculmis* Fr. Schmidt and the like.

Both L-glufosinate alone as well as the inventive mixtures are also suitable for controlling weeds that are resistant to commonly used herbicides such as, for example, weeds that are resistant to glyphosate, weeds that are resistant to auxin inhibitor herbicides such as e.g. 2,4-D or dicamba, weeds that are resistant to photosynthesis inhibitors such as e.g. atrazine, weeds that are resistant to ALS inhibitors such as e.g. sulfonylureas, imidazolinones or triazolopyrimidines, weeds that are resistant to ACCase inhibitors such as e.g. clodinafop, clethodim or pinoxaden or weeds that are resistant to protoporphyrinogen-IX-oxidase inhibitors such as e.g. sulfentrazone, flumioxazine, fomesafen or acifluorfen, for example the weeds that are listed in the International Survey of Resistant Weeds (http://www.weedscience.org/Summary/SpeciesbySOATable.aspx). In particular, they are suitable for controlling the resistant weeds that are listed in the International Survey of Resistant Weeds, for example ACCase resistant *Echinochloa crus-galli, Avena fatua, Alopecurus myosuroides, Echinochloa colona, Alopecurus japonicus, Bromus tectorum, Hordeum murinum, Ischaemum rugosum, Setaria viridis, Sorghum halepense, Alopecurus aequalis, Apera spicaventi, Avena sterilis, Beckmannia szygachne, Bromus diandrus, Digitaria sanguinalis, Echinocloa oryzoides, Echinochloa phyllopogon, Phalaris minor, Phalaris paradoxa, Setaria faberi, Setaria viridis, Brachypodium distachyon, Bromus diandrus, Bromus sterilis, Cynosurus echinatus, Digitaria insularis, Digitaria ischaemum, Leptochloa chinensis, Phalaris brachystachis, Rotboellia cochinchinensis, Digitaria ciliaris, Ehrharta longiflora, Eriochloa punctata, Leptochloa panicoides, Lolium persicum, Polypogon fugax, Sclerochloa kengiana, Snowdenia polystacha, Sorghum sudanese* and *Brachiaria plantaginea*, ALS inhibitor resistant *Echinochloa crus-galli, Poa annua, Avena fatua, Alopecurus myosuroides, Echinochloa colona, Amaranthus hybridus, Amaranthus palmeri, Amaranthus rudis, Conyza sumatrensis, Amaranthus retroflexus, Ambrosia artemisifolia, Conyza canadensis, Kochia scoparia, Raphanus raphanistrum, Senecio vernalis, Alopecurus japonicus, Bidens pilosa, Bromus tectorum, Chenopodium album, Conyza bonariensis, Hordeum murinum, Ischaemum rugosum, Senecio vulgaris, Setaria viridis, Sisymbrium orientale, Sorghum halepense, Alopecurus aequalis, Amaranthus blitum, Amaranthus powellii, Apera spicaventi, Avena sterilis, Brassica rapa, Bromus diandrus, Descurainia sophia, Digitaria sanguinalis, Echinochloa oryzoides, Echinochloa phyllopogon, Euphorbia heterophylla, Lactuca serriola, Phalaris minor, Phalaris paradoxa, Setaria faberi, Setaria viridis, Sinapis arvensis, Solanum ptycanthum, Sonchus oleraceus, Stellaria media, Amaranthus blitoides, Amaranthus spinosus, Amaranthus viridis, Ambrosia trifida, Bidens subalternans, Bromus diandrus, Bromus sterilis, Capsella bursa-pastoris, Centaurea cyanus, Cynosurus echinatus, Cyperus difformis, Fimbristilis miliacea, Galeopsis tetrahit, Galium aparine, Galium spurium, Helianthus annuus, Hirschfeldia incana, Limnocharis flava, Limnophila erecta, Papaver rhoeas, Parthenium hysterophorus, Phalaris brachystachis, Polygonum convolvulus, Polygonum lapathifolium, Polygonum persicaria, Ranunculus acris, Rottboellia cochinchinensis, Sagittaria montevidensis, Salsola tragus, Schoenoplectus mucronatus, Setaria pumila, Sonchus asper, Xanthium strumarium, Ageratum conyzoides, Alisma canaliculatum, Alisma plantago-aquatica, Ammannia auriculata, Ammannia coccinea, Ammannia arvensis, Anthemis cotula, Bacopa rotundifolia, Bifora radians, Blyxa aubertii, Brassica tournefortii, Bromus japonicus, Bromus secalinus, Lithospermum arvense, Camelina microcarpa, Chamaesyce maculata, Chrysanthemum coronarium, Clidemia hirta, Crepis tectorum, Cuscuta pentagona, Cyperus brevifolis,*

*Cyperus compressus, Cyperus esculentus, Cyperus iria, Cyperus odoratus, Damasonium minus, Diplotaxis erucoides, Diplotaxis tenuifolia, Dopatrum junceum, Echium plantagineum, Elatine triandra, Eleocharis acicularis, Erucaria hispanica, Erysimum repandum, Galium tricornutum, Iva xanthifolia, Ixophorus unisetus, Lamium amplexicaule, Limnophilia sessiliflora, Lindernia dubia, Lindernia micrantha, Lindernia procumbens, Ludwigia prostrata, Matricaria recutita, Mesembryanthemum crystallinum, Monochoria korsakowii, Monochoria vaginalis, Myosoton aquaticum, Neslia paniculata, Oryza sativa* var. *sylvatica, Pentzia suffruticosa, Picris hieracioides, Raphanus sativus, Rapistrum rugosum, Rorippa indica, Rotala indica, Rotala pusilla, Rumex dentatus, Sagittaria guayensis, Sagittaria pygmaea, Sagittaria trifolia, Schoenoplectus fluviatilis, Schoenoplectus juncoides, Schoenoplectus wallichii, Sida spinosa, Silene gallica, Sinapis alba, Sisymbrium thellungii, Sorghum bicolor, Spergula arvensis, Thlaspi arvense, Tripleurospermum perforatum, Vaccaria hispanica* and *Vicia sativa*, photosynthesis inhibitor resistant *Echinochloa crus-galli, Poa annua, Alopecurus myosuroides, Echinochloa colona, Amaranthus hybridus, Amaranthus palmeri, Amaranthus rudis, Conyza sumatrensis, Amaranthus retroflexus, Ambrosia artemisifolia, Conyza canadensis, Kochia scoparia, Raphanus raphanistrum, Senecio vernalis, Alopecurus japonicus, Bidens pilosa, Bromus tectorum, Chenopodium album, Conyza bonariensis, Ischaemum rugosum, Senecio vulgaris, Setaria viridis, Sisymbrium orientale, Amaranthus blitum, Amaranthus powellii, Apera spica-venti, Beckmannia syzigachne, Brassica rapa, Digitaria sanguinalis, Euphorbia heterophylla, Phalaris minor, Phalaris paradoxa, Setaria faberi, Setaria viridis, Sinapis arvensis, Solanum ptycanthum, Stellaria media, Amaranthus blitoides, Amaranthus viridis, Bidens subalternans, Brachypodium distachyon, Capsella bursa-pastoris, Chloris barbata, Cyperus difformis, Echinochloa erecta, Epilobium ciliatum, Polygonum aviculare, Polygonum convolvulus, Polygonum lapathifolium, Polygonum persicaria, Portulaca oleracea, Schoenoplectus mucronatus, Setaria pumila, Solanum nigrum, Sonchus asper, Urochloa panicoides, Vulpia bromoides, Abutilon theophrasti, Amaranthus albus, Amaranthus cruentus, Arabidopsis thaliana, Arenaria serpyllifolia, Bidens tripartita, Chenopodium album, Chenopodium ficifolium, Chenopodium polyspermum, Crypsis schoenoides, Datura stramonium, Epilobium tetragonum, Galinsoga ciliata, Matricaria discoidea, Panicum capillare, Panicum dichotomiflorum, Plantago lagopus, Polygonum hydopiper, Polygonum pensylvanicum, Polygonum monspeliensis, Rostraria, smyrnacea, Rumex acetosella, Setaria verticillata* and *Urtica urens*, PS-I-electron diversion inhibitor resistant *Poa annua, Conyza sumatrensis, Conyza canadensis, Alopecurus japonicus, Bidens pilosa, Conyza bonariensis, Hordeum murinum, Ischaemum rugosum, Amaranthus blitum, Solanum ptycanthum, Arctotheca calendula, Epilobium ciliatum, Hedyotis verticillata, Solanum nigrum, Vulpia bromoides, Convolvulus arvensis, Crassocephalum crepidioides, Cuphea carthagensis, Erigeron philadelphicus, Gamochaeta pensylvanica, Landoltia punctata, Lepidium virginicum, Mazus fauriei, Mazus pumilus, Mitracarpus hirtus, Sclerochloa dura, Solanum americanum* and *Youngia japonica*, glyphosate resistant *Poa annua, Echinochloa colona, Amaranthus hybridus, Amaranthus palmeri, Amaranthus rudis, Conyza sumatrensis, Ambrosia artemisifolia, Conyza canadensis, Kochia scoparia, Raphanus raphanistrum, Bidens pilosa, Conyza bonariensis, Hordeum murinum, Sorghum halepense, Brassica rapa, Bromus diandrus, Lactuca serriola, Sonchus oleraceus, Amaranthus spinosus, Ambrosia trifida, Digitaria insularis, Hedyotis verticillata, Helianthus annuus, Parthenium hysterophorus, Plantago lanceolata, Salsola tragus, Urochloa panicoides, Brachiaria eruciformis, Bromus rubens, Chloris elata, Chloris truncata, Chloris virgata, Cynodon hirsutus, Lactuca saligna, Leptochloa virgata, Paspalum paniculatum* and *Tridax procumbens*, microtubule assembly inhibitor resistant *Echinochloa crus-galli, Poa annua, Avena fatua, Alopecurus myosuroides, Amaranthus palmeri, Setaria viridis, Sorghum halepense, Alopecurus aequalis, Beckmannia syzigachne* and *Fumaria densifloria*, auxin herbicide resistant *Echinochloa crus-galli, Echinochloa colona, Amaranthus hybridus, Amaranthus rudis, Conyza sumatrensis, Kochia scoparia, Raphanus raphanistrum, Chenopodia album, Sisymbrium orientale, Descurainia sophia, Lactuca serriola, Sinapis arvensis, Sonchus oleraceus, Stellaria media, Arctotheca calendula, Centaurea cyanus, Digitaria ischaemum, Fimbristylis miliacea, Galeopsis tetrahit, Galium aparine, Galium spurium, Hirschfeldia incana, Limnocharis flava, Limnocharis erecta, Papaver rhoeas, Plantago lanceolata, Ranunculus acris, Carduus nutans, Carduus pycnocephalus, Centaurea soltitialis, Centaurea stoebe* ssp. Micranthos, *Cirsium arvense, Commelina diffusa, Echinochloa crus-pavonis, Soliva sessilis* and *Sphenoclea zeylanica*, HPPD inhibitor resistant *Amaranthus palmeri* and *Amaranthus rudis*, PPO inhibitor resistant *Acalypha australis, Amaranthus hybridus, Amaranthus palmeri, Amaranthus retroflexus, Amaranthus rudis, Ambrosia artemisifolia, Avena fatua, Conyza sumatrensis, Descurainia sophia, Euphorbia heterophylla* and *Senecio vernalis*, carotenoid biosynthesis inhibitor resistant *Hydrilla verticillata, Raphanus raphanistrum, Senecio vernalis* and *Sisymbrium orientale*, VLCFA inhibitor resistant *Alopecurus myosuroides, Avena fatua* and *Echinochloa crus-galli*.

The inventive mixtures are suitable for combating/controlling common harmful plants in fields, where useful plants shall be planted (i.e. in crops). The inventive mixtures are generally suitable for burndown of undesired vegetation in fields of the following crops:

Grain crops, including e.g.
cereals (small grain crops) such as wheat (*Triticum aestivum*) and wheat like crops such as durum (*T. durum*), einkorn (*T. monococcum*), emmer (*T. dicoccon*) and spelt (*T. spelta*), rye (*Secale cereale*), triticale (*Tritiosecale*), barley (*Hordeum vulgare*);
maize (corn; *Zea mays*);
sorghum (e.g. *Sorghum bicolour*);
rice (*Oryza* spp. such as *Oryza sativa* and *Oryza glaberrima*); and
sugar cane;

Legumes (Fabaceae), including e.g. soybeans (*Glycine max.*), peanuts (*Arachis hypogaea* and pulse crops such as peas including *Pisum sativum*, pigeon pea and cowpea, beans including broad beans (*Vicia faba*), *Vigna* spp., and *Phaseolus* spp. and lentils (*Lens culinaris* var.);

brassicaceae, including e.g. canola (*Brassica napus*), oilseed rape (OSR, *Brassica napus*), cabbage (*B. oleracea* var.), mustard such as *B. juncea, B. campestris, B. narinosa, B. nigra* and *B. tournefortii*; and turnip (*Brassica rapa* var.);

other broadleaf crops including e.g. sunflower, cotton, flax, linseed, sugarbeet, potato and tomato;

TNV-crops (TNV: trees, nuts and vine) including e.g. grapes, citrus, pomefruit, e.g. apple and pear, coffee, pistachio and oilpalm, stonefruit, e.g. peach, almond, walnut, olive, cherry, plum and apricot;

turf, pasture and rangeland;
onion and garlic;
bulb ornamentals such as tulips and narcissus;
conifers and deciduous trees such as pinus, fir, oak, maple, dogwood, hawthorne, crabapple, and rhamnus (buckthorn); and
garden ornamentals such as roses, petunia, marigold and snapdragon.

The inventive mixtures are in particular suitable for burndown of undesired vegetation in fields of the following crop plants: small grain crops such as wheat, barley, rye, triticale and durum, rice, maize (corn), sugarcane, sorghum, soybean, pulse crops such as pea, bean and lentils, peanut, sunflower, sugarbeet, potato, cotton, brassica crops, such as oilseed rape, canola, mustard, cabbage and turnip, turf, pasture, rangeland, grapes, pomefruit, such as apple and pear, stonefruit, such as peach, almond, walnut, pecans, olive, cherry, plum and apricot, citrus, coffee, pistachio, garden ornamentals, such as roses, petunia, marigold, snap dragon, bulb ornamentals such as tulips and narcissus, conifers and deciduous trees such as pinus, fir, oak, maple, dogwood, hawthorne, crabapple and rhamnus.

The inventive mixtures are most suitable for burndown of undesired vegetation in fields of the following crop plants: small grain crops such as wheat, barley, rye, triticale and durum, rice, maize, sugarcane, soybean, pulse crops such as pea, bean and lentils, peanut, sunflower, cotton, brassica crops, such as oilseed rape, canola, turf, pasture, rangeland, grapes, stonefruit, such as peach, almond, walnut, pecans, olive, cherry, plum and apricot, citrus and pistachio.

The invention furthermore relates to the use of a mixture as defined herein for controlling undesirable vegetation in crops in a burndown program, wherein the crop is produced by genetic engineering or by breeding, are resistant to one or more herbicides and/or pathogens such as plant-pathogenous fungi, and/or to attack by insects; preferably resistant to glufosinate. Thus, in as used in the present invention, the term "crops" as used herein includes also (crop) plants which have been modified by mutagenesis or genetic engineering in order to provide a new trait to a plant or to modify an already present trait.

Mutagenesis includes techniques of random mutagenesis using X-rays or mutagenic chemicals, but also techniques of targeted mutagenesis, in order to create mutations at a specific locus of a plant genome. Targeted mutagenesis techniques frequently use oligonucleotides or proteins like CRISPR/Cas, zinc-finger nucleases, TALENs or meganucleases to achieve the targeting effect.

Genetic engineering usually uses recombinant DNA techniques to create modifications in a plant genome which under natural circumstances cannot readily be obtained by cross breeding, mutagenesis or natural recombination. Typically, one or more genes are integrated into the genome of a plant in order to add a trait or improve a trait. These integrated genes are also referred to as transgenes in the art, while plant comprising such transgenes are referred to as transgenic plants. The process of plant transformation usually produces several transformation events, which differ in the genomic locus in which a transgene has been integrated. Plants comprising a specific transgene on a specific genomic locus are usually described as comprising a specific "event", which is referred to by a specific event name. Traits which have been introduced in plants or have been modified include in particular herbicide tolerance, insect resistance, increased yield and tolerance to abiotic conditions, like drought.

Herbicide tolerance has been created by using mutagenesis as well as using genetic engineering. Plants which have been rendered tolerant to acetolactate synthase (ALS) inhibitor herbicides by conventional methods of mutagenesis and breeding comprise plant varieties commercially available under the name Clearfield®. However, most of the herbicide tolerance traits have been created via the use of transgenes.

Herbicide tolerance has been created to glyphosate, glufosinate, 2,4-D, dicamba, oxynil herbicides, like bromoxynil and ioxynil, sulfonylurea herbicides, ALS inhibitor herbicides and 4-hydroxyphenylpyruvate dioxygenase (HPPD) inhibitors, like isoxaflutole and mesotrione. Transgenes which have been used to provide herbicide tolerance traits comprise: for tolerance to glyphosate: cp4 epsps, epsps grg23ace5, mepsps, 2mepsps, gat4601, gat4621 and goxv247, for tolerance to glufosinate: pat and bar, for tolerance to 2,4-D: aad-1 and aad-12, for tolerance to dicamba: dmo, for tolerance to oxynil herbicies: bxn, for tolerance to sulfonylurea herbicides: zm-hra, csrl-2, gm-hra, S4-HrA, for tolerance to ALS inhibitor herbicides: csrl-2, for tolerance to HPPD inhibitor herbicides: hppdPF, W336 and avhppd-03.

Transgenic corn events comprising herbicide tolerance genes are for example, but not excluding others, DAS40278, MON801, MON802, MON809, MON810, MON832, MON87411, MON87419, MON87427, MON88017, MON89034, NK603, GA21, MZHGOJG, HCEM485, VCO-Ø1981-5, 676, 678, 680, 33121, 4114, 59122, 98140, Bt10, Bt176, CBH-351, DBT418, DLL25, MS3, MS6, MZIR098, T25, TC1507 and TC6275.

Transgenic soybean events comprising herbicide tolerance genes are for example, but not excluding others, GTS 40-3-2, MON87705, MON87708, MON87712, MON87769, MON89788, A2704-12, A2704-21, A5547-127, A5547-35, DP356043, DAS44406-6, DAS68416-4, DAS-81419-2, GU262, SYHTOH2, W62, W98, FG72 and CV127.

Transgenic cotton events comprising herbicide tolerance genes are for example, but not excluding others, 19-51a, 31707, 42317, 81910, 281-24-236, 3006-210-23, BXN10211, BXN10215, BXN10222, BXN10224, MON1445, MON1698, MON88701, MON88913, GHB119, GHB614, LLCotton25, T303-3 and T304-40.

Transgenic canola events comprising herbicide tolerance genes are for example, but not excluding others, MON88302, HCR-1, HCN10, HCN28, HCN92, MS1, MS8, PHY14, PHY23, PHY35, PHY36, RF1, RF2 and RF3.

Insect resistance has mainly been created by transferring bacterial genes for insecticidal proteins to plants. Transgenes which have most frequently been used are toxin genes of *Bacillus* spec. and synthetic variants thereof, like cry1A, cry1Ab, cry1Ab-Ac, cry1Ac, cry1A.105, cry1F, cry1Fa2, cry2Ab2, cry2Ae, mcry3A, ecry3.1Ab, cry3Bb1, cry34Ab1, cry35Ab1, cry9C, vip3A(a), vip3Aa20. However, also genes of plant origin have been transferred to other plants. In particular genes coding for protease inhibitors, like CpTI and pinII. A further approach uses transgenes in order to produce double stranded RNA in plants to target and down-regulate insect genes. An example for such a transgene is dvsnf7.

Transgenic corn events comprising genes for insecticidal proteins or double stranded RNA are for example, but not excluding others, Bt10, Bt11, Bt176, MON801, MON802, MON809, MON810, MON863, MON87411, MON88017, MON89034, 33121, 4114, 5307, 59122, TC1507, TC6275, CBH-351, MIR162, DBT418 and MZIR098.

Transgenic soybean events comprising genes for insecticidal proteins are for example, but not excluding others, MON87701, MON87751 and DAS-81419.

Transgenic cotton events comprising genes for insecticidal proteins are for example, but not excluding others, SGK321, MON531, MON757, MON1076, MON15985, 31707, 31803, 31807, 31808, 42317, BNLA-601, Event1, COT67B, COT102, T303-3, T304-40, GFM Cry1A, GK12, MLS 9124, 281-24-236, 3006-210-23, GHB119 and SGK321.

Increased yield has been created by increasing ear biomass using the transgene athb17, being present in corn event MON87403, or by enhancing photosynthesis using the transgene bbx32, being present in the soybean event MON87712.

Crops comprising a modified oil content have been created by using the transgenes: gm-fad2-1, Pj.D6D, Nc.Fad3, fad2-1A and fatb1-A. Soybean events comprising at least one of these genes are: 260-05, MON87705 and MON87769.

Tolerance to abiotic conditions, in particular to tolerance to drought, has been created by using the transgene cspB, comprised by the corn event MON87460 and by using the transgene Hahb-4, comprised by soybean event IND-ØØ41Ø-5.

Traits are frequently combined by combining genes in a transformation event or by combining different events during the breeding process. Preferred combination of traits are herbicide tolerance to different groups of herbicides, insect tolerance to different kind of insects, in particular tolerance to lepidopteran and coleopteran insects, herbicide tolerance with one or several types of insect resistance, herbicide tolerance with increased yield as well as a combination of herbicide tolerance and tolerance to abiotic conditions.

Plants comprising singular or stacked traits as well as the genes and events providing these traits are well known in the art. For example, detailed information as to the mutagenized or integrated genes and the respective events are available from websites of the organizations "International Service for the Acquisition of Agri-biotech Applications (ISAAA)" (http://www.isaaa.org/gmapprovaldatabase) and the "Center for Environmental Risk Assessment (CERA)" (http://cera-gmc.org/GMCropDatabase), as well as in patent applications, like EP3028573 and WO2017/011288.

The use of inventive mixtures on crops may result in effects which are specific to a crop comprising a certain gene or event. These effects might involve changes in growth behavior or changed resistance to biotic or abiotic stress factors. Such effects may in particular comprise enhanced yield, enhanced resistance or tolerance to insects, nematodes, fungal, bacterial, mycoplasma, viral or viroid pathogens as well as early vigour, early or delayed ripening, cold or heat tolerance as well as changed amino acid or fatty acid spectrum or content.

Furthermore, plants are also covered that contain by the use of recombinant DNA techniques a modified amount of ingredients or new ingredients, specifically to improve raw material production, e.g., potatoes that produce increased amounts of amylopectin (e.g. Amflora® potato, BASF SE, Germany).

Preferred are crops, which are tolerant to glufosinate, wherein the glufosinate tolerant crop plant is preferably selected from the group consisting of rice, canola, soybean, corn and cotton plants.

Transgenic corn events comprising glufosinate tolerance genes are for example, but not excluding others, 5307 x MIR604 x Bt11 x TC1507 x GA21 x MIR162 (event code: SYN-Ø53Ø7-1 x SYN-IR6Ø4-5 x SYN-BTØ11-1 x DAS-Ø15Ø7-1 x MON-ØØØ21-9 x SYN-IR162-4, gene: pat, e.g. commercially available as Agrisure® Duracade™ 5222), 59122 (event code: DAS-59122-7, gene: pat, e.g. commercially available as Herculex™ RW), 5307 x MIR604 x Bt11 x TC1507 x GA21 (event code: SYN-Ø53Ø7-1 x SYN-IR6Ø4-5 x SYN-BTØ11-1 x DAS-Ø15Ø7-1 x MON-ØØØ21-9, gene: pat, e.g. commercially available as Agrisure® Duracade™ 5122), 59122 x NK603 (event code: DAS-59122-7 x MON-ØØ6Ø3-6, gene: pat, e.g. commercially available as Herculex™ RW Roundup Ready™ 2), Bt10 (gene: pat, e.g. commercially available as Bt10), Bt11 (X4334CBR, X4734CBR) (event code: SYN-BTØ11-1, gene: pat, e.g. commercially available as Agrisure™ CB/LL), BT11 x 59122 x MIR604 x TC1507 x GA21 (event code: SYN-BTØ11-1 x DAS-59122-7 x SYN-IR6Ø4-5 x DAS-Ø15Ø7-1 x MON-ØØØ21-9, gene: pat, e.g. commercially available as Agrisure® 3122), Bt11 x GA21 (event code: SYN-BTØ11-1 x MON-ØØØ21-9, gene: pat, e.g. commercially available as Agrisure™ GT/CB/LL), Bt11 x MIR162 (event code: SYN-BTØ11-1 x SYN-IR162-4, gene: pat, e.g. commercially available as Agrisure® Viptera™ 2100), Bt11 x MIR162 x GA21 (event code: SYN-BTØ11-1 x SYN-IR162-4 x MON-ØØØ21-9, gene: pat, e.g. commercially available as Agrisure® Viptera™ 3110), Bt11 x MIR162 x MIR604 (event code: SYN-BTØ11-1 x SYN-IR162-4 x SYN-IR6Ø4-5, gene: pat, e.g. commercially available as Agrisure® Viptera™ 3100), Bt11 x MIR162 x MIR604 x GA21 (event code: SYN-BTØ11-1 x SYN-IR162-4 x SYN-IR6Ø4-5 x MON-ØØØ21-9, gene: pat, e.g. commercially available as Agrisure® Viptera™ 3111, Agrisure® Viptera™ 4), Bt11 x MIR162 x TC1507 x GA21 (event code: SYN-BTØ11-1 x SYN-IR162-4 x DAS-Ø15Ø7-1 x MON-ØØØ21-9, gene: pat, e.g. commercially available as Agrisure™ Viptera 3220), Bt11 x MIR604 (event code: SYN-BTØ11-1 x SYN-IR6Ø4-5, gene: pat, e.g. commercially available as Agrisure™ CB/LL/RW), BT11 x MIR604 x GA21 (event code: SYN-BTØ11-1 x SYN-IR6Ø4-5 x MON-ØØØ21-9, gene: pat, e.g. commercially available as Agrisure™ 3000GT), Bt176 (176) (event code: SYN-EV176-9, gene: bar, e.g. commercially available as NaturGard KnockOut™, Maximizer™), CBH-351 (event code: ACS-ZMØØ4-3, gene: bar, e.g. commercially available as Starlink™ Maize), DBT418 (event code: DKB-89614-9, gene: bar, e.g. commercially available as Bt Xtra™ Maize), MON89034 x TC1507 x MON88017 x 59122 (event code: MON-89Ø34-3 x DAS-Ø15Ø7-1 x MON-88Ø17-3 x DAS-59122-7, gene: pat, e.g. commercially available as Genuity® SmartStax™), MON89034 x TC1507 x NK603 (event code: MON-89Ø34-3 x DAS-Ø15Ø7-1 x MON-ØØ6Ø3-6, gene: pat, e.g. commercially available as Power Core™), NK603 x T25 (event code: MON-ØØ6Ø3-6 x ACS-ZMØØ3-2, gene: pat, e.g. commercially available as Roundup Ready™ Liberty Link™ Maize), T14 (event code: ACS-ZMØØ2-1, gene: pat, e.g. commercially available as Liberty Link™ Maize), T25 (event code: ACS-ZMØØ3-2, gene: pat, e.g. commercially available as Liberty Link™ Maize), T25 x MON810 (event code: ACS-ZMØØ3-2 x MON-00810-6, gene: pat, e.g. commercially available as Liberty Link™ Yieldgard™ Maize), TC1507 (event code: DAS-Ø15Ø7-1, gene: pat, e.g. commercially available as Herculex™ I, Herculex™ CB), TC1507 x 59122 x MON810 x MIR604 x NK603 (event code: DAS-Ø15Ø7-1 x DAS-59122-7 x MON-ØØ81Ø-6 x SYN-IR6Ø4-5 x MON-ØØ6Ø3, gene: pat, e.g. commercially available as Optimum™ Intrasect Xtreme), TC1507 x 59122 (event code: DAS-Ø15Ø7-1 x DAS-59122-7, gene: pat, e.g. commercially available as Herculex XTRA™), TC1507 x MON810 x NK603 (event code: DAS-Ø15Ø7-1 x DAS-59122-7 x MON-ØØ81Ø-6 x MON-ØØ6Ø3-6, gene: pat, e.g. commercially available as Optimum™ Intrasect XTRA), TC1507 x 59122 x NK603 (event code: DAS-Ø15Ø7-1 x DAS-59122-7 x MON-ØØ6Ø3-6, gene: pat, e.g. commercially available as Herculex XTRA™ RR), TC1507 x MIR604 x NK603 (event code: DAS-Ø15Ø7-1 x SYN-IR6Ø4-5 x MON-ØØ6Ø3-6, gene: pat, e.g. commercially available as Optimum™ TRIsect), TC1507 x MON810 x NK603 (event code: DAS-Ø15Ø7-1 x MON-ØØ81Ø-6 x MON-ØØ6Ø3-6, gene: pat, e.g. commercially available as Optimum™ Intrasect), TC1507 x NK603 (event code: DAS-Ø15Ø7-1 x MON-ØØ6Ø3-6, gene: pat, e.g. commercially available as Herculex™ I RR), 3272 x Bt11 (event code: SYN-E3272-5 x SYN-BTØ11-1 gene: pat), 3272 x Bt11 x GA21 (event code: SYN-E3272-5 x SYN-BTØ11-1 x MON-ØØØ21-9, gene: pat), 3272 x Bt11 x MIR604 (event code: SYN-E3272-5 x SYN-BTØ11-1 x SYN-IR6Ø4-5, gene: pat), 3272 x BT11 x MIR604 x GA21 (event code: SYN-E3272-5 x SYN-BTØ11-1 x SYN-IR6Ø4-5 x MON-ØØØ21-9, gene: pat), 33121 (event code: DP-Ø33121-3, gene: pat), 4114 (event code: DP-ØØ4114-3, gene: pat), 59122 x GA21 (event code: DAS-59122-7 x MON-ØØØ21-9, gene: pat), 59122 x MIR604 (event code: DAS-59122-7 x SYN-IR6Ø4-5, gene: pat), 5307 x MIR604 x Bt11 x TC1507 x GA21 x MIR162 (event code: gene: pat), 59122 x MIR604 x GA21 (event code: DAS-59122-7 x SYN-IR6Ø4-5 x MON-ØØØ21-9, gene: pat), 59122 x MIR604 x TC1507 (event code: DAS-59122-7 x SYN-IR6Ø4-5 x DAS-Ø15Ø7-1, gene: pat), 59122 x MIR604 x TC1507 x GA21 (event code: gene: pat), (event code: DAS-59122-7 x SYN-IR6Ø4-5 x DAS-Ø15Ø7-1 x MON-ØØØ21-9, gene: pat), 59122 x MON810 (event code: DAS-59122-7 x MON-ØØ81Ø-6, gene: pat), 59122 x MON810 x NK603 (event code: DAS-59122-7 x MON-ØØ81Ø-6 x MON-ØØ6Ø3-6, gene: pat), 59122 x TC1507 x GA21 (event code: DAS-59122-7 x DAS-Ø15Ø7-1 x MON-ØØØ21-9, gene: pat), 676 (event code: PH-ØØØ676-7, gene: pat), 678 (event code: PH-ØØØ678-9, gene: pat), 680 (event code: PH-ØØØ68Ø-2, gene: pat), 98140 x 59122 (event code: DP-Ø9814Ø-6 x DAS-59122-7, gene: pat), 98140 x TC1507 (event code: DP-Ø9814Ø-6 x DAS-Ø15Ø7-1, gene: pat), 98140 x TC1507 x 59122 (event code: DP-Ø9814Ø-6 x DAS-Ø15Ø7-1 x DAS-59122-7, gene: pat), 59122 x MON88017 (event code: DAS-59122-7 x MON-88Ø17-3, gene: pat), Bt11 x 59122 (event code: SYN-BTØ11-1 x DAS-59122-7, gene: pat), Bt11 x 59122 x GA21 (event code: SYN-BTØ11-1 x DAS-59122-7 x MON-ØØØ21-9, gene: pat), Bt11 x 59122 x MIR604 (event code: SYN-BTØ11-1 x DAS-59122-7 x SYN-IR6Ø4-5, gene: pat), Bt11 x 59122 x MIR604 x GA21 (event code: SYN-BTØ11-1 x DAS-59122-7 x SYN-IR6Ø4-5 x MON-ØØØ21-9, gene: pat), Bt11 x 59122 x MIR604 x TC1507 (event code: Bt11 x 59122 x MIR604 x TC1507, gene: pat), Bt11 x 59122 x TC1507 (event code: SYN-BTØ11-1 x DAS-59122-7 x DAS-Ø15Ø7-1, gene: pat), Bt11 x 59122 x TC1507 x GA21 (event code: SYN-BTØ11-1 x DAS-59122-7 x DAS-Ø15Ø7-1 x MON-ØØØ21-9, gene: pat), Bt11 x MIR162 x TC1507 (event code: SYN-BTØ11-1 x SYN-IR162-4 x DAS-Ø15Ø7-1, gene: pat), Bt11 x MIR604 x TC1507 (event code: SYN-BTØ11-1 x SYN-IR6Ø4-5 x DAS-Ø15Ø7-1, gene: pat), Bt11 x TC1507 (event code: SYN-BTØ11-1 x DAS-Ø15Ø7-1, gene: pat), Bt11 x TC1507 x GA21 (event code: SYN-BTØ11-1 x DAS-Ø15Ø7-1 x MON-ØØØ21-9, gene: pat), GA21 x T25 (event code: MON-ØØØ21-9 x ACS-ZMØØ3-2, gene: pat), MIR162 x TC1507 (event code: SYN-IR162-4 x DAS-Ø15Ø7-1, gene: pat), MIR162 x TC1507 x GA21 (event code: SYN-IR162-4 x DAS-Ø15Ø7-1 x MON-ØØØ21-9, gene: pat), MIR604 x TC1507 (event code: SYN-IR6Ø4-5 x DAS-Ø15Ø7-1, gene: pat), MON87427 x MON89034 x TC1507 x MON88017 x 59122 (event code: MON-87427-7 x MON-89Ø34-3 x DAS-Ø15Ø7-1 x MON-88Ø17-3 x DAS-59122-7, gene: pat), MON89034 x 59122 (event code: MON-89Ø34-3 x DAS-59122-7, gene: pat), MON89034 x 59122 x MON88017 (event code: gene: pat), MON89034 x TC1507 (event code: MON-89Ø34-3 x DAS-59122-7 x MON-88Ø17-3, gene: pat), (event code: MON-89Ø34-3 x DAS-Ø15Ø7-1, gene: pat), MIR604 x TC1507 (event code: SYN-IR6Ø4-5 x DAS-Ø15Ø7-1, gene: pat), MON87427 x MON89034 x TC1507 x MON88017 x 59122 (event code: MON-87427-7 x MON-89Ø34-3 x DAS-Ø15Ø7-1 x MON-88Ø17-3 x DAS-59122-7, gene: pat), MON89034 x 59122 (event code: MON-89Ø34-3 x DAS-59122-7, gene: pat), MON89034 x 59122 x MON88017 (event code: gene: pat), MON89034 x TC1507 (event code: MON-89Ø34-3 x DAS-59122-7 x MON-88Ø17-3, gene: pat), (event code: MON-89Ø34-3 x DAS-Ø15Ø7-1, gene: pat), DLL25 (B16) (event code: DKB-89790-5, gene: bar), MIR604 x TC1507 (event code: SYN-IR6Ø4-5 x DAS-Ø15Ø7-1, gene: pat), MON87427 x MON89034 x TC1507 x MON88017 x 59122 (event code: MON-87427-7 x MON-89Ø34-3 x DAS-Ø15Ø7-1 x MON-88Ø17-3 x DAS-59122-7, gene: pat), MON89034 x 59122 (event code: MON-89Ø34-3 x DAS-59122-7, gene: pat), MON89034 x 59122 x MON88017 (event code: MON-89Ø34-3 x DAS-59122-7 x MON-88Ø17-3, gene: pat), MON89034 x TC1507 (event code: MON-89Ø34-3 x DAS-Ø15Ø7-1, gene: pat), MON89034 x TC1507 x 59122 (event code: MON-89Ø34-3 x DAS-01507-1 x DAS-59122-7, gene: pat), MON89034 x TC1507 x MON88017 (event code: MON-89Ø34-3 x DAS-Ø15Ø7-1 x MON-88Ø17-3, gene: pat), MON89034 x TC1507 x MON88017 x 59122 x DAS40278 (event code: MON-89Ø34-3 x DAS-Ø15Ø7-1 x MON-88Ø17-3 x DAS-59122-7 x DAS-40278-9, gene: pat), MON89034 x TC1507 x MON88017 x DAS40278 (event code: MON-89Ø34-3 x DAS-Ø15Ø7-1 x MON-88Ø17-3 x DAS-59122-7 x DAS-40278-9, gene: pat), MON89034 x TC1507 x NK603 x DAS40278 (event code: MON-89Ø34-3 x DAS-Ø15Ø7-1 x MON-ØØ6Ø3-6 x DAS-40278-9, gene: pat), NK603 x MON810 x 4114 x MIR 604 (event code: MON-ØØ6Ø3-6 x MON-ØØ81Ø-6 x DP004114-3 x SYN-IR6Ø4-4, gene: pat), TC1507 x MON810 x MIR604 x NK603 (event code: DAS-Ø15Ø7-1 x MON-ØØ81Ø-6 x SYN-IR6Ø4-5 x MON-ØØ6Ø3-6, gene: pat), TC1507 x 59122 x MON810 (event code: DAS-Ø15Ø7-1 x DAS-59122-7 x MON-ØØ81Ø-6, gene: pat), TC1507 x 59122 x MON88017 (event code: DAS-Ø15Ø7-1 x DAS-59122-7 x MON-88Ø17-3, gene: pat), TC1507 x GA21 (event code: DAS-Ø15Ø7-1 x MON-ØØØ21-9, gene: pat), TC1507 x MON810 (event code: DAS-Ø15Ø7-1 x MON-ØØ81Ø-6, gene: pat), TC1507 x MON810 x MIR162 x NK603 (event code: DAS-Ø15Ø7-1 x MON-ØØ81Ø-6 x SYN-IR162-4 x MON-ØØ6Ø3-6, gene: pat), 3272 x Bt11 x MIR604 x TC1507 x 5307 x GA21 (event code: SYN-E3272-5 x SYN-BTØ11-1 x SYN-IR6Ø4-5 x DAS-01507-1 x SYN-Ø53Ø7-1 x MON-ØØØ21-9, gene: pat), TC1507 x MIR162 x NK603 (event code: DAS-Ø15Ø7-1 x SYN-IR162-4 x MON-ØØ6Ø3-6, gene: pat), TC1507 x MON810 x MIR162 (event code: DAS-Ø15Ø7-1 x MON-ØØ81Ø-6 x SYN-IR162-4, gene: pat), MON87419 (event code: MON87419-8, gene: pat), TC1507 x MON88017 (event code: DAS-Ø15Ø7-1 x MON-88Ø17-3, gene: pat), TC6275 (event code: DAS-Ø6275-8, gene: bar), MZHG0JG (event code: SYN-ØØØJG-2, gene: pat), MZIR098 (event code: SYN-ØØØ98-3, gene: pat), Bt11 x MIR162 x MON89034 (event code: SYN-BTØ11-1 x SYN-IR162-4 x MON-89Ø34-3, gene: pat) and Bt11 x MIR162 x MON89034 x GA21 (event code: SYN-BTØ11-1 x SYN-IR162-4 x MON-89034-3 x MON-ØØØ21-9, gene: pat), 59122 x DAS40278 (event code: DAS-59122-7 x DAS-40278-9, gene: pat), 59122 x MON810 x MIR604 (event code: DAS-59122-7 x MON-ØØ81Ø-6 x SYN-IR6Ø4-5, gene: pat), 59122 x MON810 x NK603 x MIR604 (event code: DAS-59122-7 x MON-ØØ81Ø-6 x MON-ØØ6Ø3-6 x SYN-IR6Ø4-5, gene: pat), 59122 x MON88017 x DAS40278 (event code: DAS-59122-7 x MON-88Ø17-3 x DAS-40278-9, gene: pat), 59122 x NK603 x MIR604 (event code: DAS-59122-7 x MON-ØØ6Ø3-6 x SYN-IR6Ø4-5, gene: pat), Bt11 x 5307 (event code: SYN-BTØ11-1 x SYN-Ø53Ø7-1, gene: pat), Bt11 x 5307 x GA21 (event code: SYN-BTØ11-1 x SYN-Ø53Ø7-1 x MON-ØØØ21-9, gene: pat), Bt11 x MIR162 x 5307 (event code: SYN-BTØ11-1 x SYN-IR162-4 x SYN-Ø53Ø7-1, gene: pat), Bt11 x MIR162 x 5307 x GA21 (event code: SYN-BTØ11-1 x SYN-IR162-4 x SYN-Ø53Ø7-1 x MON-ØØØ21-9, gene: pat), Bt11 x MIR162 x MIR604 x 5307 (event code: SYN-BTØ11-1 x SYN-IR162-4 x SYN-IR6Ø4-5 x SYN-Ø53Ø7-1, gene: pat), Bt11 x MIR162 x MIR604 x 5307 x GA21 (event code: SYN-BTØ11-1 x SYN-IR162-4 x SYN-IR6Ø4-5 x SYN-Ø53Ø7-1 x MON-ØØØ21-9, gene: pat), Bt11 x MIR162 x MIR604 x MON89034 x 5307 x GA21 (event code: SYN-BTØ11-1 x SYN-IR162-4 x SYN-IR6Ø4-5 x MON-89Ø34-3 x SYN-Ø53Ø7-1 x MON-ØØØ21-9, gene: pat), BT11 x MIR162 x MIR604 x TC1507 (event code: SYN-BTØ11-1 x SYN-IR162-4 x SYN-IR6Ø4-5 x DAS-Ø15Ø7-1, gene: pat), BT11 x MIR162 x MIR604 x TC1507 x 5307 (event code: SYN-BTØ11-1 x SYN-IR162-4 x SYN-IR6Ø4-5 x DAS-Ø15Ø7-1 x SYN-Ø53Ø7-1, gene: pat), Bt11 x MIR162 x MIR604 x TC1507 x GA21 (event code: SYN-BTØ11-1 x SYN-IR162-4 x SYN-IR6Ø4-5 x DAS-Ø15Ø7-1 x MON-ØØØ21-9, gene: pat), Bt11 x MIR162 x TC1507 x 5307 (event code: SYN-BTØ11-1 x SYN-IR162-4 x DAS-Ø15Ø7-1 x SYN-Ø53Ø7-1, gene: pat), BT11 x MIR162 x MIR604 x TC1507 x 5307 (event code: SYN-BTØ11-1 x SYN-IR162-4 x SYN-IR6Ø4-5 x DAS-01507-1 x SYN-Ø53Ø7-1, gene: pat), Bt11 x MIR162 x MIR604 x TC1507 x GA21 (event code: SYN-BTØ11-1 x SYN-IR162-4 x SYN-IR6Ø4-5 x DAS-Ø15Ø7-1 x MON-ØØØ21-9, gene: pat), Bt11 x MIR162 x TC1507 x 5307 (event code: SYN-BTØ11-1 x SYN-IR162-4 x DAS-Ø15Ø7-1 x SYN-Ø53Ø7-1, gene: pat), Bt11 x MIR162 x TC1507 x 5307 x GA21 (event code: SYN-BTØ11-1 x SYN-IR162-4 x DAS-Ø15Ø7-1 x SYN-Ø53Ø7-1 x MON-ØØØ21-9, gene: pat), Bt11 x MIR604 x 5307 (event code: SYN-BTØ11-1 x SYN-IR6Ø4-5 x SYN-Ø53Ø7-1, gene: pat), Bt11 x MIR604 x 5307 x GA21 (event code: SYN-BTØ11-1 x SYN-IR6Ø4-5 x SYN-Ø53Ø7-1 x MON-00021-9, gene: pat), Bt11 x MIR604 x TC1507 x 5307 (event code: SYN-BTØ11-1 x SYN-IR6Ø4-5 x DAS-Ø15Ø7-1 x SYN-Ø53Ø7-1, gene: pat), Bt11 x MIR604 x TC1507 x GA21 (event code: SYN-BTØ11-1 x SYN-IR6Ø4-5 x DAS-Ø15Ø7-1 x MON-ØØØ21-9, gene: pat), Bt11 x MON89034 (or Bt11 x MON89034) (event code: SYN-BTØ11-1 x MON-89Ø34-3, gene: pat), Bt11 x MON89034 x GA21 (event code: SYN-BTØ11-1 x MON-89Ø34-3 x MON-ØØØ21-9, gene: pat), Bt11 x MON89034 x GA21 (event code: SYN-BTØ11-1 x MON-89Ø34-3 x MON-ØØØ21-9, gene: pat), Bt11 x TC1507 x 5307 (event code: SYN-BTØ11-1 x DAS-Ø15Ø7-1 x SYN-Ø53Ø7-1, gene: pat), Bt11 x TC1507 x 5307 x GA21 (event code: SYN-BTØ11-1 x DAS-Ø15Ø7-1 x SYN-Ø53Ø7-1 x MON-ØØØ21-9, gene: pat), MIR162 x MIR604 x TC1507 x 5307 (event code: SYN-IR162-4 x SYN-IR6Ø4-5 x DAS-Ø15Ø7-1 x SYN-Ø53Ø7-1, gene: pat), MIR162 x MIR604 x TC1507 x 5307 x GA21 (event code: SYN-IR162-4 x SYN-IR6Ø4-5 x DAS-Ø15Ø7-1 x SYN-Ø53Ø7-1 x MON-ØØØ21-9, gene: pat), MIR162 x MIR604 x TC1507 x GA21 (event code: SYN-IR162-4 x SYN-IR6Ø4-5 x DAS-Ø15Ø7-1 x MON-ØØØ21-9, gene: pat), MIR162 x TC1507 x 5307 (event code: SYN-IR162-4 x DAS-Ø15Ø7-1 x SYN-Ø53Ø7-1, gene: pat), MIR162 x TC1507 x 5307 x GA21 (event code: SYN-IR162-4 x DAS-Ø15Ø7-1 x SYN-Ø53Ø7-1 x MON-ØØØ21-9, gene: pat), MIR604 x TC1507 x 5307 (event code: SYN-IR6Ø4-5 x DAS-Ø15Ø7-1 x SYN-Ø53Ø7-1, gene: pat), MIR162 x TC1507 x 5307 (event code: SYN-IR162-4 x DAS-Ø15Ø7-1 x SYN-Ø53Ø7-1, gene: pat), MIR162 x TC1507 x 5307 x GA21 (event code: SYN-IR162-4 x DAS-Ø15Ø7-1 x SYN-Ø53Ø7-1 x MON-ØØØ21-9, gene: pat), MIR604 x TC1507 x 5307 (event code: SYN-IR6Ø4-5 x DAS-Ø15Ø7-1 x SYN-Ø53Ø7-1, gene: pat), MIR604 x TC1507 x 5307 x GA21 (event code: SYN-IR6Ø4-5 x TC1507 x SYN-Ø53Ø7-1 x MON-ØØØ21-9, gene: pat), MIR604 x TC1507 x GA21 (event code: SYN-IR6Ø4-5 x TC1507 x MON-ØØØ21-9, gene: pat), MON87427 x 59122 (event code MON-87427-7 x DAS-59122-7: gene: pat), MON87427 x MON89034 x 59122 (event code: MON-87427-7 x MON-89Ø34-3 x DAS-59122-7, gene: pat), MON87427 x MON89034 x MON88017 x 59122 (event code: MON-87427-7 x MON-89Ø34-3 x MON-88Ø17-3 x 59122, gene: pat), MON87427 x MON89034 x TC1507 (event code: MON-87427-7 x MON-89Ø34-3 x DAS-Ø15Ø7-1, gene: pat), MON87427 x MON89034 x TC1507 x 59122 (event code: MON-87427-7 x MON-89Ø34-3 x DAS-Ø15Ø7-1 x DAS-59122-7, gene: pat), MON87427 x MON89034 x TC1507 x MON87411 x 59122 (event code: MON-87427-7 x MON-89Ø34-3 x DAS-Ø15Ø7-1 x MON-87411-9 x DAS-59122-7, gene: pat), MON87427 x MON89034 x TC1507 x MON87411 x 59122 x DAS40278 (event code: MON-87427-7 x MON-89Ø34-3 x DAS-Ø15Ø7-1 x MON-87411-9 x DAS-59122-7 x DAS-40278-9, gene: pat), MON87427 x MON89034 x TC1507 x MON88017 (event code: MON-87427-7 x MON-89Ø34-3 x DAS-Ø15Ø7-1 x MON-88Ø17-3, gene: pat), MON87427 x TC1507 (event code: MON-87427-7 x DAS-Ø15Ø7-1, gene: pat), MON87427 x TC1507 x 59122 (event code: MON-87427-7 x DAS-Ø15Ø7-1 x DAS-59122-7, gene: pat), MON87427 x TC1507 x MON88017 (event code: MON-87427-7 x DAS-Ø15Ø7-1 x MON-88Ø17-3, gene: pat), MON87427 x TC1507 x MON88017 x 59122 (event code: MON-87427-7 x DAS-Ø15Ø7-1 x MON-88Ø17-3 x DAS-59122-7, gene: pat), MON89034 x 59122 x DAS40278 (event code: MON-89Ø34-3 x DAS-59122-7 x DAS-40278-9, gene: pat), MON89034 x 59122 x MON88017 x DAS40278 (event code: MON-89Ø34-3 x DAS-59122-7 x MON-88Ø17-3 x DAS-40278-9, gene: pat), MON89034 x TC1507 x 59122 x DAS40278 (event code: MON-89Ø34-3 x DAS-Ø15Ø7-1 x DAS-59122-7 x DAS-40278-9, gene: pat), MON89034 x TC1507 x DAS40278 (event code: MON-89Ø34-3 x DAS-Ø15Ø7-1 x DAS-40278-9, gene: pat), MON89034 x TC1507 x NK603 x MIR162 (event code: MON-89Ø34-3 x DAS-Ø15Ø7-1 x MON-ØØ6Ø3-6 x SYN-IR162-4, gene: pat), TC1507 x 5307 (event code: DAS-Ø15Ø7-1 x SYN-Ø53Ø7-1, gene: pat), TC1507 x 5307 x GA21 (event code: DAS-Ø15Ø7-1 x SYN-Ø53Ø7-1 x MON-ØØØ21-9, gene: pat), TC1507 x 59122 x DAS40278 (event code: DAS-Ø15Ø7-1 x DAS- 59122-7 x DAS-40278-9, gene: pat), TC1507 x 59122 x MON810 x MIR604 (event code: DAS-01507-1 x DAS-59122-7 x MON-00810-6 x SYN-IR604-5, gene: pat), TC1507 x 59122 x MON88017 x DAS40278 (event code: DAS-01507-1 x DAS-59122-7 x MON-88017-3 x DAS-40278-9, gene: pat), TC1507 x 59122 x NK603 x MIR604 (event code: gene: pat) DAS-01507-1 x DAS-59122-7 x MON-00603-6 x SYN-IR604-5, TC1507 x DAS40278 (event code: DAS-01507-1 x DAS-40278-9, gene: pat), TC1507 x MON810 x MIR604 (event code: DAS-01507-1 x MON-00810-6 x SYN-IR604-5, gene: pat), TC1507 x MON810 x NK603 x MIR604 (event code: DAS-01507-1 x MON-00810-6 x MON-00603-6 x SYN-IR604-5, gene: pat), TC1507 x MON88017 x DAS40278 (event code: DAS-01507-1 x MON-88017-3 x DAS-40278-9, gene: pat) and TC1507 x NK603 x DAS40278 (event code: DAS-01507-1 x MON-00603-6 x DAS-40278-9, gene: pat).

Transgenic soybean events comprising glufosinate tolerance genes are for example, but not excluding others, A2704-12 (event code: ACS-GM005-3, gene: pat, e.g. commercially available as Liberty Link™ soybean), A2704-21 (event code: ACS-GM004-2, gene: pat, e.g. commercially available as Liberty Link™ soybean), A5547-127 (event code: ACS-GM006-4, gene: pat, e.g. commercially available as Liberty Link™ soybean), A5547-35 (event code: ACS-GM008-6, gene: pat, e.g. commercially available as Liberty Link™ soybean), GU262 (event code: ACS-GM003-1, gene: pat, e.g. commercially available as Liberty Link™ soybean), W62 (event code: ACS-GM002-9, gene: pat, e.g. commercially available as Liberty Link™ soybean), W98 (event code: ACS-GM001-8, gene: pat, e.g. commercially available as Liberty Link™ soybean), DAS68416-4 (event code: DAS-68416-4, gene: pat, e.g. commercially available as Enlist™ Soybean), DAS44406-6 (event code: DAS-44406-6, gene: pat), DAS68416-4 x MON89788 (event code: DAS-68416-4 x MON-89788-1, gene: pat), SYHTOH2 (event code: SYN-000H2-5, gene: pat), DAS81419 x DAS44406-6 (event code: DAS-81419-2 x DAS-44406-6, gene: pat) and FG72 x A5547-127 (event code: MST-FG072-3 x ACS-GM006-4, gene: pat).

Transgenic cotton events comprising glufosinate tolerance genes are for example, but not excluding others, 3006-210-23 x 281-24-236 x MON1445 (event code: DAS-21023-5 x DAS-24236-5 x MON-01445-2, gene: bar, e.g. commercially available as WideStrike™ Roundup Ready™ Cotton), 3006-210-23 x 281-24-236 x MON88913 (event code: DAS-21023-5 x DAS-24236-5 x MON-88913-8, gene: bar, e.g. commercially available as Widestrike™ Roundup Ready Flex™ Cotton), 3006-210-23 x 281-24-236 x MON88913 x COT102 (event code: DAS-21023-5 x DAS-24236-5 x MON-88913-8 x SYN-IR102-7, gene: pat, e.g. commercially available as Widestrike™ x Roundup Ready Flex™ x VIPCOT™ Cotton), GHB614 x LLCotton25 (event code: BCS-GH002-5 x ACS-GH001-3, gene: bar, e.g. commercially available as GlyTol™ Liberty Link™), GHB614 x T304-40 x GHB119 (event code: BCS-GH002-5 x BCS-GH004-7 x BCS-GH005-8, gene: bar, e.g. commercially available as Glytol™ x Twinlink™), LLCotton25 (event code: ACS-GH001-3, gene: bar, e.g. commercially available as ACS-GH001-3), GHB614 x T304-40 x GHB119 x COT102 (event code: BCS-GH002-5 x BCS-GH004-7 x BCS-GH005-8 x SYN-IR102-7, gene: bar, e.g. commercially available as Glytol™ x Twinlink™ x VIPCOT™ Cotton), LLCotton25 x MON15985 (event code: ACS-GH001-3 x MON-15985-7, gene: bar, e.g. commercially available as Fibermax™ Liberty Link™ Bollgard II™), T304-40 x GHB119 (event code: BCS-GH004-7 x BCS-GH005-8, gene: bar, e.g. commercially available as TwinLink™ Cotton), GHB614 x T304-40 x GHB119 x COT102 (event code: BCS-GH002-5 x BCS-GH004-7 x BCS-GH005-8 x SYN-IR102-7, gene: bar, e.g. commercially available as Glytol™ x Twinlink™ x VIPCOT™ Cotton), GHB119 (event code: BCS-GH005-8, gene: bar), GHB614 x LLCotton25 x MON15985 (event code: CS-GH002-5 x ACS-GH001-3 x MON-15985-7, gene: bar), MON 88701-3 (event code: MON88701, gene: bar), T303-3 (event code: BCS-GH003-6, gene: bar), T304-40 (event code: BCS-GH003-6, gene: bar), (event code: BCS-GH004-7, gene: bar), 81910 (event code: DAS-81910-7, gene: pat), MON8870 (event code: MON 88701-3, gene: bar), MON88701 x MON88913 (event code: MON 88701-3 x MON-88913-8, gene: bar), MON88701 x MON88913 x MON15985 (event code: MON 88701-3 x MON-88913-8 x MON-15985-7, gene: bar), 281-24-236 x 3006-210-23 x COT102 x 81910 (event code: DAS-24236-5 x DAS-21023-5 x SYN-IR102-7 x DAS-81910-7, gene: pat), COT102 x MON15985 x MON88913 x MON88701 (event code: SYN-IR102-7 x MON-15985-7 x MON-88913-8 x MON 88701-3, gene: bar) and 3006-210-23 x 281-24-236 x MON88913 x COT102 x 81910 (event code: DAS-21023-5 x DAS-24236-5 x MON-88913-8 x SYN-IR102-7 x DAS-81910-7, gene: pat).

Transgenic canola events comprising glufosinate tolerance genes are for example, but not excluding others, HCN10 (Topas 19/2) (event code: gene: bar, e.g. commercially available as Liberty Link™ Independence™), HCN28 (T45) (event code: ACS-BN008-2, gene: pat, e.g. commercially available as InVigor™ Canola), HCN92 (Topas 19/2 (event code: ACS-BN007-1, gene: bar, e.g. commercially available as Liberty Link™ Innovator™), MS1 (B91-4) (event code: ACS-BN004-7, gene: bar, e.g. commercially available as InVigor™ Canola), MS1 x RF1 (PGS1) (event code: ACS-BN004-7 x ACS-BN001-4, gene: bar, e.g. commercially available as InVigor™ Canola), MS1 x RF2 (PGS2) (event code: ACS-BN004-7 x ACS-BN002-5, gene: bar, e.g. commercially available as InVigor™ Canola), MS1 x RF3 (event code: ACS-BN004-7 x ACS-BN003-6, gene: bar, e.g. commercially available as InVigor™ Canola), MS8 (event code: ACS-BN005-8, gene: bar, e.g. commercially available as InVigor™ Canola), MS8 x RF3 (event code: ACS-BN005-8 x ACS-BN003-6, gene: bar, e.g. commercially available as InVigor™ Canola), RF1 (B93-101) (event code: ACS-BN001-4, gene: bar, e.g. commercially available as InVigor™ Canola), RF2 (B94-2) (event code: ACS-BN002-5, gene: bar, e.g. commercially available as InVigor™ Canola), RF3 (event code: ACS-BN003-6, gene: bar, e.g. commercially available as InVigor™ Canola), MS1 x MON88302 (event code: ACS-BN004-7 x MON-88302-9, gene: bar, e.g. commercially available as InVigor™ x TruFlex™ Roundup Ready™ Canola), MS8 x MON88302 (event code: ACS-BN005-8 x MON-88302-9, gene: bar, e.g. commercially available as InVigor™ x TruFlex™ Roundup Ready™ Canola), RF1 x MON88302 (event code: ACS-BN001-4 x MON-88302-9, gene: bar, e.g. commercially available as InVigor™ x TruFlex™ Roundup Ready™ Canola), RF2 x MON88302 (event code: ACS-BN002-5 x MON-88302-9, gene: bar, e.g. commercially available as InVigor™ x TruFlex™ Roundup Ready™ Canola), HCN28 x MON88302 (event code: ACS-BN008-2 x MON-88302-9, gene: pat, e.g. commercially available as InVigor™ x TruFlex™ Roundup Ready™ Canola), HCN92 x MON88302 (event code: ACS-BN007-1 x MON-88302-9, gene: bar, e.g. commercially available as Liberty Link™ Innovator™ x TruFlex™ Roundup Ready™ Canola), HCR-1 (gene: pat), MON88302 x MS8 x RF3 (event code: MON-88302-9 x ACS-BNØØ5-8 x ACS-BNØØ3-6, gene: bar), MON88302 x RF3 (event code: MON-88302-9 x ACS-BNØØ3-6, gene: bar), MS8 x RF3 x GT73 (RT73) (event code: gene: bar), PHY14 (event code: ACS-BNØØ5-8 x ACS-BNØØ3-6 x MON-ØØØ73-7, gene: bar), PHY23 (gene: bar), PHY35 (gene: bar) and PHY36 (gene: bar) and 73496 x RF3 (event code: DP-Ø73496-4 x ACS-BNØØ3-6, gene: bar).

Transgenic rice events comprising glufosinate tolerance genes are for example, but not excluding others, LLRICE06 (event code: ACS-OSØØ1-4, e.g. commercially available as Liberty Link™ rice), LLRICE601 (event code: BCS-OSØØ3-7, e.g. commercially available as Liberty Link™ rice) and LLRICE62 (event code: ACS-OSØØ2-5, e.g. commercially available as Liberty Link™ rice).

The inventive mixtures can be applied in conventional manner by using techniques as skilled person is familiar with. Suitable techniques include spraying, atomizing, dusting, spreading or watering. The type of application depends on the intended purpose in a well known manner; in any case, they should ensure the finest possible distribution of the active ingredients according to the invention.

In one embodiment, the inventive mixtures are applied to locus mainly by spraying, in particular foliar spraying of an aqueous dilution of the active ingredients of the mixture. Application can be carried out by customary spraying techniques using, for example, water as carrier and spray liquor rates of from about 10 to 2000 l/ha or 50 to 1000 l/ha (for example from 100 to 500 l/ha). Application of the inventive mixtures by the low-volume and the ultra-low-volume method is possible, as is their application in the form of microgranules.

The required application rate of the mixture of the pure active compounds depends on the density of the undesired vegetation, on the development stage of the plants, on the climatic conditions of the location where the mixture is used and on the application method.

In general, the rate of application of L-glufosinate is usually from 50 g/ha to 3000 g/ha and preferably in the range from 100 g/ha to 2000 g/ha or from 200 g/ha to 1500 g/ha of active substance (a.i.), and the rate of application of the bleacher herbicide is from 1 g/ha to 2000 g/ha and preferably in the range from 5 g/ha to 1500 g/ha, more preferably from 25 g/ha to 900 g/ha of active substance (a.i.).

The invention claimed is:

1. A herbicidal mixture comprising:
   a) L-glufosinate and its salts as compound I; and
   b) mesotrione as compound II;
   wherein:
   L-glufosinate comprises more than 70% by weight of the L-enantiomer; and
   the weight ratio of compound I to compound II is from 1000:1 to 1:500.

2. The herbicidal mixture of claim 1, wherein compound I is selected from the group consisting of L-glufosinate-ammonium, L-glufosinate-sodium as L-glufosinate salts, and L-glufosinate as free acid.

3. The herbicidal mixture of claim 1, wherein compound I is L-glufosinate-ammonium.

4. The herbicidal mixture of claim 1, wherein L-glufosinate comprises more than 80% by weight of the L-enantiomer.

5. The herbicidal mixture of claim 1, wherein L-glufosinate comprises more than 90% by weight of the L-enantiomer.

6. The herbicidal mixture of claim 1, wherein L-glufosinate comprises 95% by weight of the L-enantiomer.

7. The herbicidal mixture of claim 1, wherein the weight ratio of compound I to compound II is from 50:1 to 1:5.

8. A pesticidal composition, comprising a liquid or solid carrier and the herbicidal mixture of claim 1.

9. A method for controlling undesirable vegetation comprising applying the herbicidal mixture according of claim 1 to a locus where undesirable vegetation is present or is expected to be present.

10. The method of claim 9, comprising applying the herbicidal mixture of claim 1 prior to emergence of a crop planted at the locus.

11. The method of claim 9, comprising applying the herbicidal mixture of claim 1 prior to planting a crop at the locus.

12. The method of claim 9, wherein;
   a crop has been or will be planted at the locus; and
   the crop is selected from rice, maize, pulse crops, cotton, canola, small grain cereals, soybeans, peanut, sugarcane, sunflower, plantation crops, tree crops, nuts and grapes.

13. The method of claim 9, wherein:
   a crop has been or will be planted at the locus; and
   the crop is selected from glufosinate tolerant crops.

14. The method of claim 9, wherein compounds I and II of the herbicidal mixture as defined in claim 1 are applied simultaneously, that is jointly or separately, or in succession.

15. The method of claim 9, comprising:
   applying the compound I to the locus at an application rate in a range from 50 g/ha to 3000 g/ha; and
   applying the compound II to the locus at an application rate in a range from 5 g/ha to 1500 g/ha.

16. The method of claim 9, comprising:
   applying the compound I to the locus at an application rate in a range from 100 g/ha to 1500 g/ha; and
   applying the compound II to the locus at an application rate in a range from 25 g/ha to 900 g/ha.

17. The herbicidal mixture of claim 1, wherein the weight ratio of compound I to compound II is from 50:1 to 1:40.

18. The herbicidal mixture of claim 1, wherein the weight ratio of compound I to compound II is from 20:1 to 1:20.

19. The herbicidal mixture of claim 1, wherein the weight ratio of compound I to compound II is from 10:1 to 1:5.

20. The herbicidal mixture of claim 1, wherein the weight ratio of compound I to compound II is from 500:1 to 1:5.

* * * * *